United States Patent
Liu et al.

(10) Patent No.: US 12,324,002 B2
(45) Date of Patent: Jun. 3, 2025

(54) METHOD FOR DETERMINING PHYSICAL SIDELINK FEEDBACK CHANNEL RESOURCE AND APPARATUS

(71) Applicant: HUAWEI TECHNOLOGIES CO., LTD., Shenzhen (CN)

(72) Inventors: Yun Liu, Shenzhen (CN); Jian Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 518 days.

(21) Appl. No.: 17/763,321

(22) PCT Filed: Sep. 10, 2020

(86) PCT No.: PCT/CN2020/114591
§ 371 (c)(1),
(2) Date: Mar. 24, 2022

(87) PCT Pub. No.: WO2021/057502
PCT Pub. Date: Apr. 1, 2021

(65) Prior Publication Data
US 2022/0400467 A1    Dec. 15, 2022

(30) Foreign Application Priority Data
Sep. 29, 2019  (CN) .......................... 201910937257.2

(51) Int. Cl.
*H04W 72/30*    (2023.01)
*H04L 1/1607*    (2023.01)
(Continued)

(52) U.S. Cl.
CPC .......... *H04W 72/30* (2023.01); *H04L 1/1642* (2013.01); *H04L 5/0053* (2013.01); *H04L 27/2605* (2013.01)

(58) Field of Classification Search
None
See application file for complete search history.

(56) References Cited

U.S. PATENT DOCUMENTS

| | | | |
|---|---|---|---|
| 11,405,144 B2* | 8/2022 | Park | H04L 1/1893 |
| 2013/0301515 A1* | 11/2013 | Kim | H04L 1/1864 370/312 |

(Continued)

FOREIGN PATENT DOCUMENTS

| | | |
|---|---|---|
| CN | 109891981 A | 6/2019 |
| CN | 110214427 A | 9/2019 |

(Continued)

OTHER PUBLICATIONS

ZTE, "Discussion on Groupcast feedback for NR V2X", 3GPP TSG-RAN WG2 Meeting #107, R2-1909078, Prague, Czech Republic, Aug. 26-30, 2019, 6 pages.

(Continued)

*Primary Examiner* — Otis L Thompson, Jr.
(74) *Attorney, Agent, or Firm* — Maier & Maier, PLLC

(57) ABSTRACT

A method for determining a physical sidelink feedback channel resource and an apparatus are provided. The method includes: a first terminal device sends multicast information to at least two second terminal devices. The first terminal device determines, based on a total quantity of terminal devices in a multicast group and a resource group of physical sidelink feedback channel resources, a physical sidelink feedback channel resource corresponding to each second terminal device. The first terminal device receives, based on the physical sidelink feedback channel resource corresponding to each second terminal device, feedback information sent by each of the at least two second terminal devices. According to the foregoing method, physical sidelink feed- (Continued)

back channel resources can be allocated to the terminal devices in the multicast group.

20 Claims, 9 Drawing Sheets

(51) Int. Cl.
*H04L 5/00* (2006.01)
*H04L 27/26* (2006.01)

(56) References Cited

U.S. PATENT DOCUMENTS

| | | | | |
|---|---|---|---|---|
| 2020/0235848 | A1* | 7/2020 | Nguyen | H04L 1/0038 |
| 2020/0322099 | A1* | 10/2020 | Park | H04W 72/20 |
| 2020/0344722 | A1* | 10/2020 | He | H04W 72/0446 |
| 2020/0396040 | A1* | 12/2020 | Miao | H04W 4/40 |
| 2021/0075552 | A1* | 3/2021 | Huang | H04L 1/1864 |
| 2021/0219268 | A1* | 7/2021 | Li | H04B 17/318 |
| 2021/0306824 | A1* | 9/2021 | Li | H04W 4/40 |
| 2021/0314097 | A1* | 10/2021 | Osawa | H04L 1/1864 |
| 2021/0351877 | A1* | 11/2021 | Xu | H04L 5/0055 |
| 2022/0085923 | A1* | 3/2022 | Ye | H04L 1/1854 |
| 2022/0086806 | A1* | 3/2022 | Lu | H04W 72/02 |
| 2022/0110097 | A1* | 4/2022 | Zhao | H04L 5/0055 |
| 2022/0123905 | A1* | 4/2022 | Lu | H04L 5/0055 |
| 2022/0132471 | A1* | 4/2022 | Hwang | H04W 72/20 |
| 2022/0159649 | A1* | 5/2022 | Ko | H04W 72/23 |
| 2022/0201654 | A1* | 6/2022 | Lee | H04W 72/20 |
| 2022/0278797 | A1* | 9/2022 | Lee | H04W 92/18 |
| 2022/0295504 | A1* | 9/2022 | Lee | H04W 72/20 |

FOREIGN PATENT DOCUMENTS

| | | | |
|---|---|---|---|
| WO | 2017026970 | A1 | 2/2017 |
| WO | 2018171540 | A1 | 9/2018 |
| WO | 2019128261 | A1 | 7/2019 |

OTHER PUBLICATIONS

Media Tek Inc., "Physical layer procedures for sidelink", 3GPP TSG RAN WG1 #98, R1-1908401, Prague, CZ, Aug. 26-30, 2019, 16 pages.

Huawei et al., "Sidelink physical layer procedures for NR V2X", 3GPP TSG RAN WG1 Meeting #98, R1-1908040, Prague, Czech Republic, Aug. 26-30, 2019, 25 pages.

ITL, "Physical layer procedure for NR V2X", 3GPP TSG RAN WG1 #98, R1-1909117, Prague, CZ, Aug. 26-30, 2019, 7 pages.

3GPP TS 38.211 V15.7.0, "3rd Generation Partnership Project; Technical Specification Group Radio Access Network; NR; Physical channels and modulation (Release 15)", Sep. 2019, 97 pages.

ZTE et al., "Discussion on PHY procedures for sidelink", 3GPP TSG RAN WG1 #98, R1-1908896, Prague, CZ, Aug. 26-30, 2019, 9 pages.

Vivo, "Physical layer procedure for NR sidelink", 3GPP TSG RAN WG1 Meeting #98, R1-1908154, Prague, CZ, Aug. 26-30, 2019, 19 pages.

Spreadstrum Communications, "Consideration on physical layer procedures", 3GPP TSG RAN WG1 Meeting #95, R1-1813075, Spokane, USA, Nov. 12-16, 2018, 6 pages.

3GPP TS 38.212 V15.7.0, "3rd Generation Partnership Project; Technical Specification Group Radio Access Network; NR; Multiplexing and channel coding (Release 15)", Sep. 2019, 101 pages.

LG Electronics, "Discussion on physical layer structure for NR sidelink", 3GPP TSG RAN WG1 #98, R1-1908900, Prague, CZ, Aug. 26-30, 2019, 34 pages.

Ericsson, "PHY layer procedures for NR sidelink", 3GPP TSG-RAN WG1 Meeting #98, R1-1908917, Prague, CZ, Aug. 26-30, 2019, 11 pages.

CATT, "Support of unicast, groupcast and broadcast in NR sidelink", 3GPP TSG RAN1 Meeting #94bis, R1-1810539, Chengdu, China, Oct. 8-12, 2018, 10 pages.

3GPP TS 38.213 V15.7.0 , 3rd Generation Partnership Project; Technical Specification Group Radio Access Network; NR; Physical layer procedures for control (Release 15), Sep. 2019, 108 pages.

3GPP TS 38.321 V15.7.0, "3rd Generation Partnership Project; Technical Specification Group Radio Access Network; NR; Medium Access Control (MAC) protocol specification (Release 15)", Sep. 2019, 78 pages.

3GPP TS 38.133 V16.0.0, "3rd Generation Partnership Project; Technical Specification Group Radio Access Network; NR; Requirements for support of radio resource management (Release 16)", Jun. 2019, 1001 pages.

* cited by examiner

US 12,324,002 B2

METHOD FOR DETERMINING PHYSICAL SIDELINK FEEDBACK CHANNEL RESOURCE AND APPARATUS

CROSS-REFERENCE TO RELATED APPLICATIONS

This application is a National Stage of International Application No. PCT/CN2020/114591, filed on Sep. 10, 2020, which claims priority to Chinese Patent Application No. 201910937257.2, filed on Sep. 29, 2019, both of which are hereby incorporated by reference in their entireties.

TECHNICAL FIELD

The embodiments relate to the field of communications technologies, and in particular, to a method for determining a physical sidelink feedback channel resource and an apparatus.

BACKGROUND

In a new radio (NR) system, physical sidelink multicast transmission between terminal devices is supported regardless of whether the terminal devices are within coverage of a network device, outside the coverage, or within partial coverage. Physical channels used to transmit multicast messages include a physical sidelink control channel (PSCCH), a physical sidelink shared channel (PSSCH), and a physical sidelink control channel (PSFCH). Hybrid automatic repeat request (HARQ) feedback information corresponding to a PSSCH is transmitted through a PSFCH.

In an existing solution, user equipment (UE) that receives a multicast message transmits a hybrid automatic repeat request-acknowledgement (HARQ-ACK) (ACK for short below) if the user equipment successfully decodes a PSSCH carrying the multicast message, or transmits a hybrid automatic repeat request-negative acknowledgement (HARQ-NACK) (NACK for short below) if the user equipment fails to decode a PSSCH carrying the multicast message. Each UE uses one PSFCH resource to carry the ACK and uses another PSFCH resource to carry the NACK. However, the existing solution does not provide allocation details about how to allocate a PSFCH resource to each UE. Based on this, a PFSCH determining method may allocate a PFSCH resource to UE in a multicast group.

SUMMARY

Embodiments may provide a method for determining a physical sidelink feedback channel resource and an apparatus, to allocate a PFSCH to UE in a multicast group.

According to a first aspect, an embodiment provides a method for determining a physical sidelink feedback channel resource. The method includes:

A first terminal device sends multicast information to at least two second terminal devices. The first terminal device determines, based on a total quantity of terminal devices in a multicast group and a resource group of physical sidelink feedback channel resources, a physical sidelink feedback channel resource corresponding to each second terminal device. The first terminal device receives, based on the physical sidelink feedback channel resource corresponding to each second terminal device, feedback information sent by each of the at least two second terminal devices.

According to the foregoing method, the first terminal device may determine a state of allocating physical sidelink feedback channel resources to the terminal devices in the multicast group.

In a possible design, the first terminal device may determine, by using the following method based on the total quantity of terminal devices and the resource group of the physical sidelink feedback channel resources, the physical sidelink feedback channel resource corresponding to each second terminal device: The first terminal device determines, based on the total quantity of terminal devices and a quantity Ni of physical resource blocks PRBs occupied by the resource group of the physical sidelink feedback channel resources, a PRB occupied by the physical sidelink feedback channel resource corresponding to each second terminal device.

In the foregoing design, the first terminal device may determine the PRB occupied by the physical sidelink feedback channel resource corresponding to each second terminal device.

In a possible design, if Ni≥2M, an $i^{th}$ terminal device in M terminal devices corresponds to an $i^{th}$ PRB and an $(i+1)^{th}$ PRB, and M represents the total quantity of terminal devices or the total quantity of terminal devices minus 1.

In the foregoing design, a probability of retransmission caused by false detection can be reduced, and reliability of a physical sidelink feedback channel resource can be ensured.

In a possible design, if Ni≥2M, an $i^{th}$ terminal device in M terminal devices corresponds to an $i^{th}$ PRB and an $(Ni-i+1)^{th}$ PRB, and M represents the total quantity of terminal devices or the total quantity of terminal devices minus 1.

In the foregoing design, a probability of retransmission caused by false detection can be reduced, and reliability of a physical sidelink feedback channel resource can be ensured.

In a possible design, if Ni<2M, and Ni is an even number, Ni/2 PRBs with the first Ni/2 PRB sequence numbers carry an ACK, and Ni/2 PRBs with the remaining Ni/2 PRB sequence numbers carry a NACK; or Ni/2 PRBs with the first Ni/2 PRB sequence numbers carry a NACK, and Ni/2 PRBs with the remaining Ni/2 PRB sequence numbers carry an ACK. Alternatively, if Ni<2M, and Ni is an odd number, $\lfloor N_i/2 \rfloor$ PRBs with the first $\lfloor N_i/2 \rfloor$ PRB sequence numbers carry an ACK, $\lfloor N_i/2 \rfloor$ PRBs with the remaining $\lfloor N_i/2 \rfloor$ PRB sequence numbers carry a NACK, and one PRB with an $(\lfloor N_i/2 \rfloor+1)^{th}$ PRB sequence number carries an ACK and a NACK; or $\lfloor N_i/2 \rfloor$ PRBs with the first $\lfloor N_i/2 \rfloor$ PRB sequence numbers carry a NACK, $\lfloor N_i/2 \rfloor$ PRBs with the remaining $\lfloor N_i/2 \rfloor$ PRB sequence numbers carry an ACK, and one PRB with an $(\lfloor N_i/2 \rfloor+1)^{th}$ PRB sequence number carries an ACK and a NACK. M represents the total quantity of terminal devices or the total quantity of terminal devices minus 1.

In the foregoing design, a probability of retransmission caused by false detection can be reduced, and reliability of a physical sidelink feedback channel resource can be ensured.

In a possible design, the first terminal device may determine, by using the following method based on the total quantity of terminal devices and the resource group, the physical sidelink feedback channel resource corresponding to each second terminal device: The first terminal device determines, based on the total quantity of terminal devices and the quantity Ni of PRBs occupied by the resource group, a minimum sequence interval corresponding to the resource group. Alternatively, the first terminal device receives indication information from a network device or another terminal device, where the indication information indicates the minimum sequence interval corresponding to the resource group, the minimum sequence interval corresponding to the resource group is a minimum value in minimum sequence intervals corresponding to all of the Ni PRBs, and the minimum sequence interval corresponding to each PRB is a minimum value in intervals of any two sequences in each PRB. The first terminal device determines, based on the minimum sequence interval corresponding to the resource group, a sequence corresponding to the physical sidelink feedback channel resource corresponding to each second terminal device.

In the foregoing design, the sequence corresponding to the physical sidelink feedback channel resource corresponding to each second terminal device is further determined by determining the minimum sequence interval corresponding to the resource group. This can maximize the minimum sequence interval corresponding to the resource group, so that a physical sidelink feedback channel resource can be effectively allocated, and a bit error rate can be reduced.

In a possible design, if Ni≥2M, the minimum sequence interval is $N_{sc}$, $N_{sc}$ represents a total quantity of sequences, and M represents the total quantity of terminal devices or the total quantity of terminal devices minus 1.

In a possible design, if Ni<2M, a minimum sequence interval corresponding to each of x PRBs is the minimum sequence interval $\Delta_1$ corresponding to the resource group, and a minimum sequence interval corresponding to each of the remaining (Ni−x) PRBs is $\Delta_2$.

$$\Delta_2 = \lfloor (2 \times M - x \times \lfloor N_{sc}/\Delta_1 \rfloor)/(N_i - x) \rfloor, \text{ or}$$

$$\Delta_1 = \lfloor (2 \times M - (N_i - x) \times \lfloor N_{sc}/\Delta_2 \rfloor)/x \rfloor,$$

x is a positive integer, M represents the total quantity of terminal devices or the total quantity of terminal devices minus 1, and $N_{sc}$ represents a total quantity of sequences.

In the foregoing design, the sequence corresponding to the physical sidelink feedback channel resource corresponding to each second terminal device is further determined by determining the minimum sequence interval corresponding to the resource group. This can maximize the minimum sequence interval corresponding to the resource group, so that a physical sidelink feedback channel resource can be effectively allocated, and a bit error rate can be reduced.

In a possible design, if Ni<2M, a minimum sequence interval corresponding to each of $$\left(2 \times M - N_i \times \left\lfloor \frac{2 \times M}{N_i} \right\rfloor\right)$$

PRBs is the minimum sequence interval $$\Delta_1 = \left\lfloor \frac{N_{sc}}{\left\lceil \frac{2 \times M}{N_i} \right\rceil} \right\rfloor$$

corresponding to the resource group, and a minimum sequence interval corresponding to each of the remaining $$\left(N_i - \left(2 \times M - N_i \times \left\lfloor \frac{2 \times M}{N_i} \right\rfloor\right)\right)$$

PRBs is $$\Delta_2 = \left\lfloor \frac{N_{sc}}{\left\lfloor \frac{2 \times M}{N_i} \right\rfloor} \right\rfloor, \text{ where } x = 2 \times M - N_i \times \left\lfloor \frac{2 \times M}{N_i} \right\rfloor.$$

In the foregoing design, the sequence corresponding to the physical sidelink feedback channel resource corresponding to each second terminal device is further determined by determining the minimum sequence interval corresponding to the resource group. This can maximize the minimum sequence interval corresponding to the resource group, so that a physical sidelink feedback channel resource can be effectively allocated, and a bit error rate can be reduced.

In a possible design, the first terminal device may determine, by using the following method based on the total quantity of terminal devices and the resource group, the physical sidelink feedback channel resource corresponding to each second terminal device: If Ni<2M, and a product of a first sequence quantity $$\left\lfloor \frac{2 \times M}{N_i} \right\rfloor$$

and Ni is not equal to 2M, the first terminal device determines that the first sequence quantity is $$\left\lfloor \frac{2 \times M}{N_i} \right\rfloor$$

and a second sequence quantity is $$\left\lceil \frac{2 \times M}{N_i} \right\rceil.$$

The first terminal device determines, based on the first sequence quantity, the second sequence quantity, and a mapping relationship between a sequence quantity and a sequence cyclic shift index combination, a sequence cyclic shift index combination corresponding to the first sequence quantity and a sequence cyclic shift index combination corresponding to the first sequence quantity. The first terminal device determines, based on the sequence cyclic shift index combination corresponding to the first sequence quantity and the sequence cyclic shift index combination corresponding to the second sequence quantity, a sequence corresponding to the physical sidelink feedback channel resource corresponding to each second terminal device. Alternatively, if Ni<2M, and a product of a first sequence quantity $$\left\lfloor \frac{2 \times M}{N_i} \right\rfloor$$

and Ni is equal to 2M, the first terminal device determines that the first sequence quantity is $$\left\lfloor \frac{2 \times M}{N_i} \right\rfloor.$$

The first terminal device determines, based on the first sequence quantity and a mapping relationship between a sequence quantity and a sequence cyclic shift index combination, a sequence cyclic shift index combination corresponding to the first sequence quantity. The first terminal device determines, based on the sequence cyclic shift index combination corresponding to the first sequence quantity, a sequence corresponding to the physical sidelink channel resource corresponding to each second terminal device. Ni represents the quantity of PRBs occupied by the resource group, and M represents the total quantity of terminal devices or the total quantity of terminal devices minus 1.

In the foregoing design, the sequence corresponding to the physical sidelink feedback channel resource corresponding to each second terminal device can be relatively easily determined, thereby reducing resource allocation complexity.

In a possible design, the mapping relationship between a sequence quantity and a sequence cyclic shift index combination includes: If the sequence quantity is 2, the sequence cyclic shift index combination is 0 and 6. Alternatively, if the sequence quantity is 3, the sequence cyclic shift index combination is 0, 4, and 8. Alternatively, if the sequence quantity is 4, the sequence cyclic shift index combination is 0, 3, 6, and 9. Alternatively, if the sequence quantity is 5, the sequence cyclic shift index combination is 0, 2, 4, 6, and 9. Alternatively, if the sequence quantity is 6, the sequence cyclic shift index combination is 0, 2, 4, 6, 8, and 10. Alternatively, if the sequence quantity is 7, the sequence cyclic shift index combination is 0, 1, 2, 4, 6, 8, and 10. Alternatively, if the sequence quantity is 8, the sequence cyclic shift index combination is 0, 1, 2, 3, 4, 6, 8, and 10. Alternatively, if the sequence quantity is 9, the sequence cyclic shift index combination is 0, 1, 2, 3, 4, 5, 6, 8, and 10. Alternatively, if the sequence quantity is 10, the sequence cyclic shift index combination is 0, 1, 2, 3, 4, 5, 6, 7, 8, and 10. Alternatively, if the sequence quantity is 11, the sequence cyclic shift index combination is 0, 1, 2, 3, 4, 5, 6, 7, 8, 9, and 10. Alternatively, if the sequence quantity is 12, the sequence cyclic shift index combination is 0, 1, 2, 3, 4, 5, 6, 7, 8, 9, 10, and 11.

In a possible design, the mapping relationship between a sequence quantity and a sequence cyclic shift index combination includes: If the sequence quantity is 2, the sequence cyclic shift index combination is 0 and 6. Alternatively, if the sequence quantity is 3, the sequence cyclic shift index combination is 0, 4, and 8. Alternatively, if the sequence quantity is 4, the sequence cyclic shift index combination is 0, 3, 6, and 9. Alternatively, if the sequence quantity is 5, the sequence cyclic shift index combination is 0, 3, 6, 8, and 10. Alternatively, if the sequence quantity is 6, the sequence cyclic shift index combination is 0, 2, 4, 6, 8, and 10. Alternatively, if the sequence quantity is 7, the sequence cyclic shift index combination is 0, 2, 4, 6, 8, 10, and 11. Alternatively, if the sequence quantity is 8, the sequence cyclic shift index combination is 0, 2, 4, 6, 8, 9, 10, and 11. Alternatively, if the sequence quantity is 9, the sequence cyclic shift index combination is 0, 2, 4, 6, 7, 8, 9, 10, and 11. Alternatively, if the sequence quantity is 10, the sequence cyclic shift index combination is 0, 2, 4, 5, 6, 7, 8, 9, 10, and 11. Alternatively, if the sequence quantity is 11, the sequence cyclic shift index combination is 0, 2, 3, 4, 5, 6, 7, 8, 9, 10, and 11. Alternatively, if the sequence quantity is 12, the sequence cyclic shift index combination is 0, 1, 2, 3, 4, 5, 6, 7, 8, 9, 10, and 11.

In a possible design, the method further includes: If a periodicity of the resource group is greater than one slot, the first terminal device initiates one multicast transmission in the periodicity of the resource group.

In the foregoing design, insufficiency of PSFCH resources can be avoided, and use complexity is relatively high.

In a possible design, the method further includes: If the periodicity of the resource group is greater than one slot, the first terminal device transmits the multicast information in the first slot in the periodicity of the resource group, and repeatedly transmits the multicast information in the remaining slots.

In the foregoing design, insufficiency of PSFCH resources can be avoided, and use complexity is relatively high.

In a possible design, the method further includes: A frequency domain resource used by the first terminal device to repeatedly transmit the multicast information in the remaining slots is the same as a frequency domain resource used by the first terminal device to transmit the multicast information in the first slot.

According to a second aspect, an embodiment provides a method for determining a physical sidelink feedback channel resource. The method includes:

A second terminal device receives multicast information from a first terminal device. The second terminal device determines, based on a total quantity of terminal devices in a multicast group and a resource group of physical sidelink feedback channel resources, a physical sidelink feedback channel resource corresponding to the second terminal device. The second terminal device sends feedback information to the first terminal device based on the physical sidelink feedback channel resource corresponding to the second terminal device.

According to the foregoing method, the first terminal device may determine a state of allocating physical sidelink feedback channel resources to the terminal devices in the multicast group.

In a possible design, the second terminal device may determine, by using the following method based on the total quantity of terminal devices and the resource group of the physical sidelink feedback channel resources, the physical sidelink feedback channel resource corresponding to the second terminal device: The second terminal device determines, based on the total quantity of terminal devices, a quantity Ni of physical resource blocks PRBs occupied by the resource group, and an identifier of the second terminal device, a PRB occupied by the physical sidelink feedback channel resource corresponding to the second terminal device.

In the foregoing design, the first terminal device may determine the PRB occupied by the physical sidelink feedback channel resource corresponding to each second terminal device.

In a possible design, if Ni≥2M, an $i^{th}$ terminal device in M terminal devices corresponds to an $i^{th}$ PRB and an $(i+1)^{th}$ PRB, and M represents the total quantity of terminal devices or the total quantity of terminal devices minus 1.

In the foregoing design, a probability of retransmission caused by false detection can be reduced, and reliability of a physical sidelink feedback channel resource can be ensured.

In a possible design, if Ni≥2M, an $i^{th}$ terminal device in M terminal devices corresponds to an $i^{th}$ PRB and an $(Ni-i+1)^{th}$ PRB, and M represents the total quantity of terminal devices or the total quantity of terminal devices minus 1.

In the foregoing design, a probability of retransmission caused by false detection can be reduced, and reliability of a physical sidelink feedback channel resource can be ensured.

In a possible design, if Ni<2M, and Ni is an even number, Ni/2 PRBs with the first Ni/2 PRB sequence numbers carry an ACK, and Ni/2 PRBs with the remaining Ni/2 PRB sequence numbers carry a NACK; or Ni/2 PRBs with the first Ni/2 PRB sequence numbers carry a NACK, and Ni/2 PRBs with the remaining Ni/2 PRB sequence numbers carry an ACK. Alternatively, if Ni<2M, and Ni is an odd number, $\lfloor N_i/2 \rfloor$ PRBs with the first $\lfloor N_i/2 \rfloor$ PRB sequence numbers carry an ACK, $\lfloor N_i/2 \rfloor$ PRBs with the remaining $\lfloor N_i/2 \rfloor$ PRB sequence numbers carry a NACK, and one PRB with an $(\lfloor N_i/2 \rfloor+1)^{th}$ PRB sequence number carries an ACK and a NACK; or $\lfloor N_i/2 \rfloor$ PRBs with the first $\lfloor N_i/2 \rfloor$ PRB sequence numbers carry a NACK, $\lfloor N_i/2 \rfloor$ PRBs with the remaining $\lfloor N_i/2 \rfloor$ PRB sequence numbers carry an ACK, and one PRB with an $(\lfloor N_i/2 \rfloor+1)^{th}$ PRB sequence number carries an ACK and a NACK. M represents the total quantity of terminal devices or the total quantity of terminal devices minus 1.

In the foregoing design, a probability of retransmission caused by false detection can be reduced, and reliability of a physical sidelink feedback channel resource can be ensured.

In a possible design, the second terminal device may determine, by using the following method based on the total quantity of terminal devices and the resource group of the physical sidelink feedback channel resources, the physical sidelink feedback channel resource corresponding to the second terminal device: The second terminal device determines, based on the total quantity of terminal devices and the quantity Ni of PRBs occupied by the resource group, a minimum sequence interval corresponding to the resource group. Alternatively, the second terminal device receives indication information from a network device or another terminal device, where the indication information indicates the minimum sequence interval corresponding to the resource group, the minimum sequence interval corresponding to the resource group is a minimum value in minimum sequence intervals corresponding to all of the Ni PRBs, and the minimum sequence interval corresponding to each PRB is a minimum value in intervals of any two sequences in each PRB. The second terminal device determines, based on the minimum sequence interval corresponding to the resource group and the identifier of the second terminal device, a sequence corresponding to the physical sidelink feedback channel resource corresponding to the second terminal device.

In the foregoing design, the sequence corresponding to the physical sidelink feedback channel resource corresponding to each second terminal device is further determined by determining the minimum sequence interval corresponding to the resource group. This can maximize the minimum sequence interval corresponding to the resource group, so that a physical sidelink feedback channel resource can be effectively allocated, and a bit error rate can be reduced.

In a possible design, if Ni≥2M, the minimum sequence interval is $N_{sc}$, $N_{sc}$ represents a total quantity of sequences, and M represents the total quantity of terminal devices or the total quantity of terminal devices minus 1.

In a possible design, if Ni<2M, a minimum sequence interval corresponding to each of x PRBs is the minimum sequence interval $\Delta_1$ corresponding to the resource group, and a minimum sequence interval corresponding to each of the remaining (Ni−x) PRBs is $\Delta_2$.

$$\Delta_2 = \lfloor (2 \times M - x \times \lfloor N_{sc}/\Delta_1 \rfloor)/(N_i - x) \rfloor, \text{ or}$$

$$\Delta_1 = \lfloor (2 \times M - (N_i - x) \times \lfloor N_{sc}/\Delta_2 \rfloor)/x \rfloor,$$

where x is a positive integer, M represents the total quantity of terminal devices or the total quantity of terminal devices minus 1, and $N_{sc}$ represents a total quantity of sequences.

In the foregoing design, the sequence corresponding to the physical sidelink feedback channel resource corresponding to each second terminal device is further determined by determining the minimum sequence interval corresponding to the resource group. This can maximize the minimum sequence interval corresponding to the resource group, so that a physical sidelink feedback channel resource can be effectively allocated, and a bit error rate can be reduced.

In a possible design, if Ni<2M, a minimum sequence interval corresponding to each of $$\left(2 \times M - N_i \times \left\lfloor \frac{2 \times M}{N_i} \right\rfloor\right)$$

PRBs is the minimum sequence interval $$\Delta_1 = \left\lceil \frac{N_{sc}}{\left\lceil \frac{2 \times M}{N_i} \right\rceil} \right\rceil$$

corresponding to the resource group, and a minimum sequence interval corresponding to each of the remaining $$\left(N_i - \left(2 \times M - N_i \times \left\lfloor \frac{2 \times M}{N_i} \right\rfloor\right)\right)$$

PRBs is $$\Delta_2 = \left\lceil \frac{N_{sc}}{\left\lfloor \frac{2 \times M}{N_i} \right\rfloor} \right\rceil, \text{ where } x = 2 \times M - N_i \times \left\lfloor \frac{2 \times M}{N_i} \right\rfloor.$$

In the foregoing design, the sequence corresponding to the physical sidelink feedback channel resource corresponding to each second terminal device is further determined by determining the minimum sequence interval corresponding to the resource group. This can maximize the minimum sequence interval corresponding to the resource group, so that a physical sidelink feedback channel resource can be effectively allocated, and a bit error rate can be reduced.

In a possible design, the second terminal device may determine, by using the following method based on the total quantity of terminal devices and the resource group of the physical sidelink feedback channel resources, the physical sidelink feedback channel resource corresponding to the second terminal device: If Ni<2M, and a product of a first sequence quantity $$\left\lfloor \frac{2 \times M}{N_i} \right\rfloor$$

and Ni is not equal to 2M, the second terminal device determines that the first sequence quantity is $$\left\lfloor \frac{2 \times M}{N_i} \right\rfloor$$

and a second sequence quantity is $$\left\lceil \frac{2 \times M}{N_i} \right\rceil.$$

The second terminal device determines, based on the first sequence quantity, the second sequence quantity, and a mapping relationship between a sequence quantity and a sequence cyclic shift index combination, a sequence cyclic shift index combination corresponding to the first sequence quantity and a sequence cyclic shift index combination corresponding to the second sequence quantity. The second terminal device determines, based on the identifier of the second terminal device, the sequence cyclic shift index combination corresponding to the first sequence quantity, and the sequence cyclic shift index combination corresponding to the second sequence quantity, a sequence corresponding to the physical sidelink feedback channel resource corresponding to the second terminal device. Alternatively, if Ni<2M, and a product of a first sequence quantity $$\left\lfloor \frac{2 \times M}{N_i} \right\rfloor$$

and Ni is equal to 2M, the second terminal device determines that the first sequence quantity is $$\left\lfloor \frac{2 \times M}{N_i} \right\rfloor.$$

The second terminal device determines, based on the first sequence quantity and a mapping relationship between a sequence quantity and a sequence cyclic shift index combination, a sequence cyclic shift index combination corresponding to the first sequence quantity. The second terminal device determines, based on the identifier of the second terminal device and the sequence cyclic shift index combination corresponding to the first sequence quantity, a sequence corresponding to the physical sidelink channel resource corresponding to the second terminal device. Ni represents the quantity of PRBs occupied by the resource group, and M represents the total quantity of terminal devices or the total quantity of terminal devices minus 1.

In the foregoing design, the sequence corresponding to the physical sidelink feedback channel resource corresponding to each second terminal device can be relatively easily determined, thereby reducing resource allocation complexity.

In a possible design, the mapping relationship between a sequence quantity and a sequence cyclic shift index combination includes: If the sequence quantity is 2, the sequence cyclic shift index combination is 0 and 6. Alternatively, if the sequence quantity is 3, the sequence cyclic shift index combination is 0, 4, and 8. Alternatively, if the sequence quantity is 4, the sequence cyclic shift index combination is 0, 3, 6, and 9. Alternatively, if the sequence quantity is 5, the sequence cyclic shift index combination is 0, 2, 4, 6, and 9. Alternatively, if the sequence quantity is 6, the sequence cyclic shift index combination is 0, 2, 4, 6, 8, and 10. Alternatively, if the sequence quantity is 7, the sequence cyclic shift index combination is 0, 1, 2, 4, 6, 8, and 10. Alternatively, if the sequence quantity is 8, the sequence cyclic shift index combination is 0, 1, 2, 3, 4, 6, 8, and 10. Alternatively, if the sequence quantity is 9, the sequence cyclic shift index combination is 0, 1, 2, 3, 4, 5, 6, 8, and 10. Alternatively, if the sequence quantity is 10, the sequence cyclic shift index combination is 0, 1, 2, 3, 4, 5, 6, 7, 8, and 10. Alternatively, if the sequence quantity is 11, the sequence cyclic shift index combination is 0, 1, 2, 3, 4, 5, 6, 7, 8, 9, and 10. Alternatively, if the sequence quantity is 12, the sequence cyclic shift index combination is 0, 1, 2, 3, 4, 5, 6, 7, 8, 9, 10, and 11.

In a possible design, the mapping relationship between a sequence quantity and a sequence cyclic shift index combination includes: If the sequence quantity is 2, the sequence cyclic shift index combination is 0 and 6. Alternatively, if the sequence quantity is 3, the sequence cyclic shift index combination is 0, 4, and 8. Alternatively, if the sequence quantity is 4, the sequence cyclic shift index combination is 0, 3, 6, and 9. Alternatively, if the sequence quantity is 5, the sequence cyclic shift index combination is 0, 3, 6, 8, and 10. Alternatively, if the sequence quantity is 6, the sequence cyclic shift index combination is 0, 2, 4, 6, 8, and 10. Alternatively, if the sequence quantity is 7, the sequence cyclic shift index combination is 0, 2, 4, 6, 8, 10, and 11. Alternatively, if the sequence quantity is 8, the sequence cyclic shift index combination is 0, 2, 4, 6, 8, 9, 10, and 11. Alternatively, if the sequence quantity is 9, the sequence cyclic shift index combination is 0, 2, 4, 6, 7, 8, 9, 10, and 11. Alternatively, if the sequence quantity is 10, the sequence cyclic shift index combination is 0, 2, 4, 5, 6, 7, 8, 9, 10, and 11. Alternatively, if the sequence quantity is 11, the sequence cyclic shift index combination is 0, 2, 3, 4, 5, 6, 7, 8, 9, 10, and 11. Alternatively, if the sequence quantity is 12, the sequence cyclic shift index combination is 0, 1, 2, 3, 4, 5, 6, 7, 8, 9, 10, and 11.

In a possible design, the second terminal device may determine, by using the following method based on the total quantity of terminal devices and the resource group of the physical sidelink feedback channel resources, the physical sidelink feedback channel resource corresponding to the second terminal device: If M represents the total quantity of terminal devices minus 1, the second terminal device generates a temporary number of the second terminal device based on a number of the first terminal device in the multicast. The second terminal device determines, based on the total quantity of terminal devices, the resource group of the physical sidelink feedback channel resources, and the temporary number of the second terminal device, the physical sidelink feedback channel resource corresponding to the second terminal device. Alternatively, if M represents the total quantity of terminal devices minus 1, the second terminal device sorts the remaining terminal devices in the multicast based on a number of the first terminal device in the multicast. The second terminal device determines, based on the total quantity of terminal devices, the resource group of the physical sidelink feedback channel resources, and a sorting result, the physical sidelink feedback channel resource corresponding to the second terminal device.

In the foregoing design, resources can be saved, a quantity of used sequences can be reduced, and a bit error rate can be reduced.

According to a third aspect, an embodiment provides a communications apparatus, for example, a first terminal device or a second terminal device. The apparatus may be a terminal device or may be a chip in the terminal device. The apparatus may include a processing unit, a sending unit, and a receiving unit. It should be understood that the sending unit and the receiving unit herein may alternatively be a transceiver unit. When the apparatus is the terminal device, the processing unit may be a processor, and the sending unit and the receiving unit may be a transceiver. The terminal device may further include a storage unit, and the storage unit may be a memory. The storage unit is configured to store instructions, and the processing unit executes the instructions stored in the storage unit, so that the terminal device performs the method in any one of the first aspect or the possible designs of the first aspect, or the method in any one of the second aspect or the possible designs of the second aspect. When the apparatus is the chip in the terminal device, the processing unit may be a processor, and the sending unit and the receiving unit may be an input/output interface, a pin, a circuit, or the like. The processing unit executes the instructions stored in the storage unit, so that the chip performs the method in any one of the first aspect or the possible designs of the first aspect, or the method in any one of the second aspect or the possible designs of the second aspect. The storage unit is configured to store the instructions. The storage unit may be a storage unit (for example, a register or a cache) in the chip, or may be a storage unit (for example, a read-only memory or a random access memory) that is in the terminal device and that is located outside the chip.

According to a fourth aspect, an embodiment further provides a computer-readable storage medium. The computer-readable storage medium stores a computer program. When the computer program is run on a computer, the computer is enabled to perform the method in any one of the first aspect or the possible designs of the first aspect, or the method in any one of the second aspect or the possible designs of the second aspect.

According to a fifth aspect, an embodiment further provides a computer program product including a program. When the computer program product is run on a computer, the computer is enabled to perform the method in any one of the first aspect or the possible designs of the first aspect, or the method in any one of the second aspect or the possible designs of the second aspect.

DETAILED DESCRIPTION OF THE EMBODIMENTS

Figure 1:
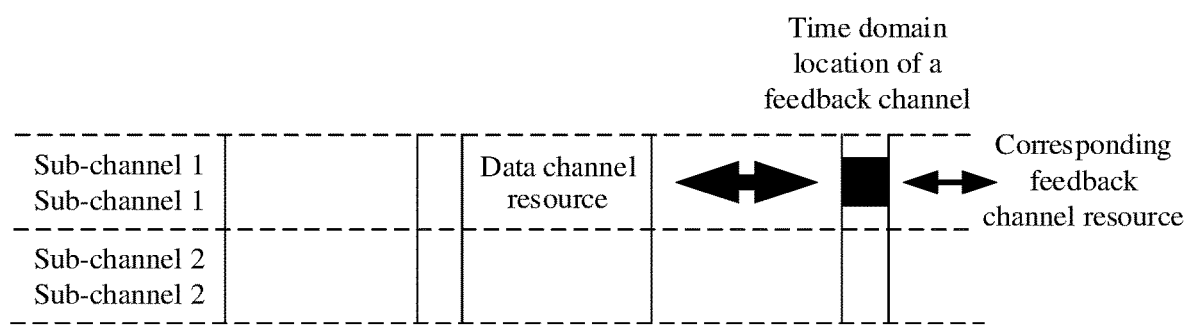
FIG. 1 is a schematic diagram of a feedback channel resource.

The following describes embodiments with reference to the accompanying drawings.

The embodiments may be applied to a fifth-generation wireless communications system (NR) system, and may also be applied to other communications systems, for example, a narrowband internet of things (NB-IoT) system, a machine type communication (MTC) system, or a future next-generation communications system.

Network elements in embodiments include a network device and a terminal device.

The network device is an entity configured to transmit or receive a signal on a network side, for example, a generation NodeB (gNodeB). The network device may be a device configured to communicate with a mobile device. The network device may be an AP in a wireless local area network (WLAN), a base transceiver station (BTS) in a global system for mobile communications (GSM) or code division multiple access (CDMA), a NodeB (NB) in wide-band code division multiple access (WCDMA), an evolved NodeB (eNodeB) in long term evolution (LTE), a relay station, an access point, a vehicle-mounted device, a wearable device, a network device in a future 5G network, a network device in a future evolved public land mobile network (PLMN), a gNodeB in an NR system, or the like. In addition, in embodiments, the network device provides a service for a cell. The terminal device communicates with the network device by using a transmission resource (for example, a frequency domain resource or a spectrum resource) used in the cell. The cell may be a cell corresponding to the network device (for example, a base station). The cell may belong to a macro base station or may belong to a base station corresponding to a small cell. The small cell herein may include a metro cell, a micro cell, a pico cell, a femto cell, or the like. The small cell is characterized by small coverage and low transmit power and is used to provide a high-rate data transmission service. In addition, in another possible case, the network device may be another apparatus that provides a wireless communication function for the terminal device. A specific technology and a specific device form that are used by the network device are not limited in embodiments. For ease of description, the apparatus that provides the wireless communication function for the terminal device is referred to as the network device.

The terminal device may be a terminal device (for example, a vehicle-mounted terminal device, or a terminal device carried by a user taking a vehicle) located on a vehicle in V2X, or may be a terminal device located on X (X may be a vehicle, an infrastructure, a network, a pedestrian, or the like), or may be the terminal in the vehicle or X. The terminal device herein may be a wireless terminal device that can receive scheduling and indication information of the network device. The wireless terminal device may be a device that provides a user with voice and/or data connectivity, a handheld device having a wireless connection function, or another processing device connected to a wireless modem. The wireless terminal device may communicate with one or more core networks or the internet through a radio access network (RAN). The wireless terminal device may be a mobile terminal device, for example, a mobile phone (or referred to as a "cellular" phone or a mobile phone), a computer, and a data card. For example, the wireless terminal device may be a portable, pocket-sized, handheld, computer built-in, or in-vehicle mobile apparatus that exchanges language and/or data with the radio access network. For example, the wireless terminal device may be a device such as a personal communications service (PCS) phone, a cordless phone, a session initiation protocol (SIP) phone, a wireless local loop (WLL) station, a personal digital assistant (PDA), a tablet computer (Pad), or a computer having a wireless transceiver function. The wireless terminal device may also be referred to as a system, a subscriber unit, a subscriber station), a mobile station (MS), a remote station, an access point (AP), a remote terminal, an access terminal, a user terminal, a user agent, a subscriber station (SS), customer premises equipment (CPE), a terminal, user equipment (UE), a mobile terminal (MT), or the like. Alternatively, the wireless terminal device may be a wearable device and a next-generation communications system, for example, a terminal device in a 5G network, a terminal device in a future evolved PLMN, or a terminal device in a new radio (NR) communications system.

In addition, embodiments are further applicable to another future-oriented communications technology. A network architecture and a service scenario are intended to describe the solutions more clearly but are not intended to limit. A person of ordinary skill in the art may know that, with evolution of network architectures and emergence of new service scenarios, the solutions are also applicable to similar problems.

The following briefly describes existing technologies.

1. HARQ

The HARQ is a technology formed by combining forward error correction (FEC) and an automatic repeat request (ARQ). FEC enables a receive end to correct some errors by adding redundant information, thereby reducing a quantity of retransmissions. For an error that FEC cannot correct, the receive end requests a transmit end to retransmit data by using an ARQ mechanism. The receive end uses an error-detection code, which is usually a CRC, to detect whether an error occurs in a received data packet. If no error occurs, the receive end sends an ACK to the transmit end, and after receiving the ACK, the transmit end sends a next data packet. If an error occurs, the receive end discards the data packet and sends a NACK to the transmit end, and after receiving the NACK, the transmit end retransmits same data.

In the ARQ mechanism described above, a manner of discarding a data packet and requesting retransmission is used. Although the data packet cannot be correctly decoded, wanted information is still included in the data packet. If the data packet is discarded, the wanted information included in the data packet is lost. By using a HARQ with soft combining (HARQ with soft combining), the receive end saves the received data packet on which an error occurs in a HARQ buffer and combines the data packet with a subsequently received retransmitted data packet, to obtain a data packet that is more reliable than that obtained through separate decoding (a process of "soft combining"). Then, the receive end decodes the combined data packet, and if the decoding still fails, the receive end repeats a process of "requesting retransmission and then performing soft combining".

2. Multicast

Multicast is a communication mode within a group of terminal devices, for example, a fleet on a highway or vehicles belonging to a same company in a campus. A total quantity of terminal devices included in the group of terminal devices is determined through negotiation when multicast is established, or determined by a network device through coordination, or determined by a terminal device that joins after multicast is established or determined by a terminal device that leaves after multicast is established.

3. Resource Pool

In NR, physical sidelink transmission is based on a resource pool. The resource pool is a logical concept. One resource pool includes a plurality of physical resources. When UE performs data transmission, the UE needs to select a physical resource from the resource pool for transmission. The resource selection process may include but is not limited to the following two cases:

In a first case, the UE selects, based on indication information of a network device, a resource from the resource pool to perform data transmission.

In a second case, the UE randomly selects a resource from the resource pool to perform data transmission.

In addition, in a long term evolution (LTE) system, a network device uses downlink control signaling to indicate a location of a feedback channel of downlink data. In a vehicle-to-everything (Vehicle-to-Everything, V2X) system, to reduce control signaling overheads, feedback information is transmitted at a time domain location of a feedback channel by using all or some of frequency domain resources that are the same as those of a data channel, as shown in FIG. 1. Therefore, when the network device configures the resource pool, the time domain location and the frequency domain location of the feedback channel have been fixed. Regardless of whether the LTE manner or the V2X method is used, a terminal device in multicast may determine a location of a resource group of a PSFCH resource by using multicast control information or configuration information of the resource pool. The resource group of the PSFCH resource includes at least one PSFCH resource.

In a resource pool, PSFCH resources appear in a periodicity of N slots, where a value of N may be 1, 2, or 4. A PSFCH corresponding to a PSSCH appearing in a slot n appears in a slot n+a, where a is a smallest integer greater than or equal to K, and a value of K depends on UE implementation. One PSFCH resource occupies at least one symbol in time domain and uses a sequence of a physical uplink control channel format (PUCCH format) 0 as a baseline. One PSFCH resource occupies one physical resource block (PRB) in frequency domain.

The PSFCH resource uses a sequence on one PRB to represent an ACK or a NACK. There are a total of 12 subcarriers on one PRB. Therefore, a maximum of 12 mutually orthogonal sequences may be supported. These sequences are obtained by performing cyclic shift on one base sequence. For example, (1, 2, 3, 4) is a sequence, and (2, 3, 4, 1) is obtained by performing cyclic shift by 1 bit. A sequence interval between the two sequences is 1, that is, a quantity of bits by which cyclic shift is performed. The base sequence may be referred to as a sequence 0, and a sequence obtained by performing shift by x is referred to as a sequence x. When different sequences are used to identify different ACKs or NACKs, a bit error rate between the different ACKs or NACKs is related to a sequence interval. A minimum value in sequence intervals of all sequences used on one PRB is a minimum sequence interval corresponding to the PRB. In one multicast, a minimum value in minimum sequence intervals corresponding to all of a plurality of PRBs included in one PSFCH resource group is a minimum sequence interval corresponding to the PSFCH resource group. A smaller minimum sequence interval corresponding to a PSFCH resource group indicates a lower bit error rate.

Based on this, embodiments provide the following several embodiments, to allocate a PFSCH resource to UE in multicast.

Embodiment 1

Figure 2:
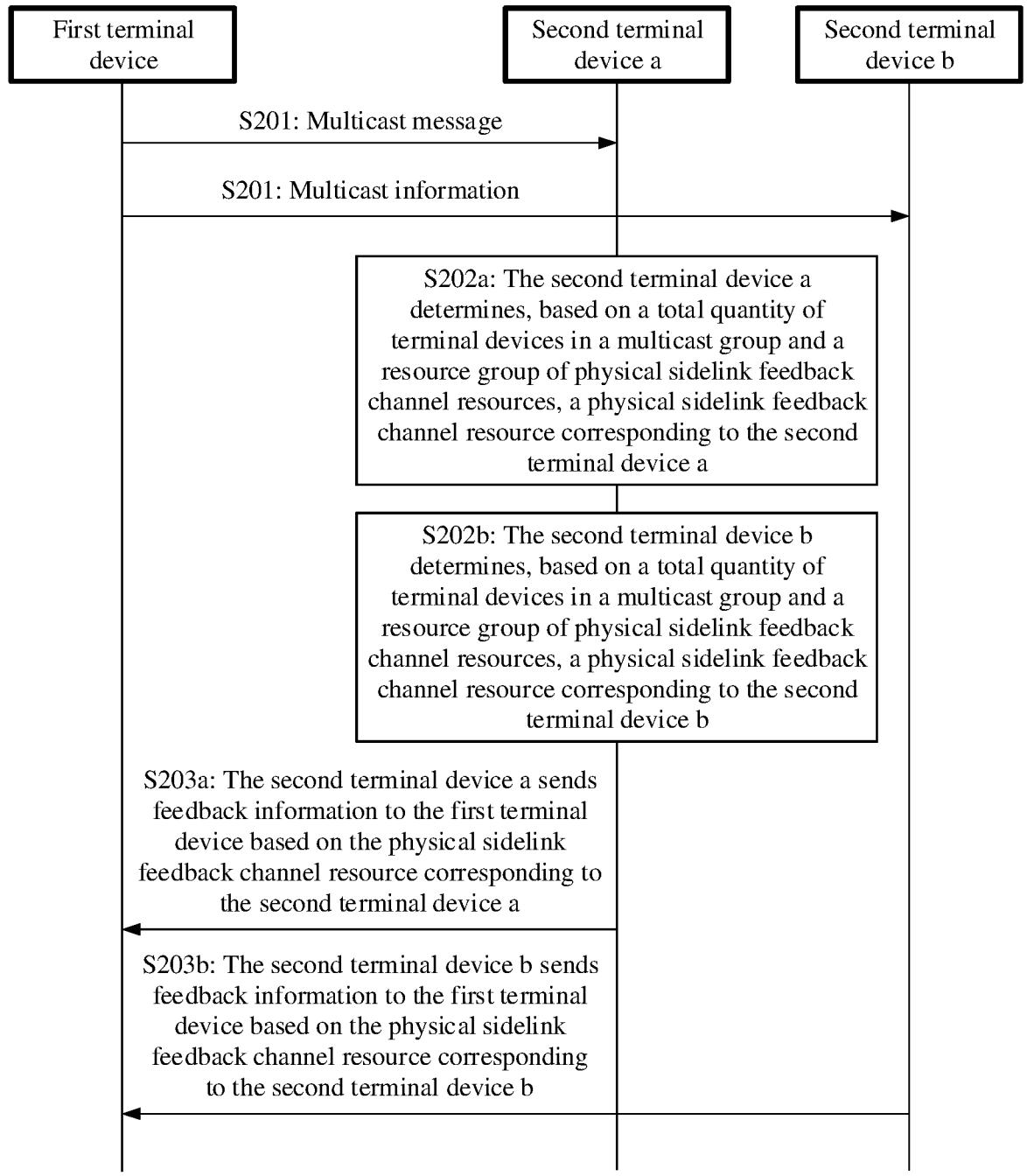
FIG. 2 is an overview flowchart 1 of a method for determining a physical sidelink feedback channel resource.

As shown in FIG. 2, an embodiment provides a method for determining a physical sidelink feedback channel resource. The method includes:

It should be noted that FIG. 2 shows only a second terminal device a and a second terminal device b in at least two second terminal devices. The following uses only the second terminal device a and the second terminal device b as an example for detailed description. For a specific processing process of another second terminal device, refer to the second terminal device a and the second terminal device b. Details are not repeated.

S201: A first terminal device sends multicast information to the at least two second terminal devices.

S202a: The second terminal device a receives the multicast information from the first terminal device. The second terminal device a determines, based on a total quantity of terminal devices in a multicast group and a resource group of physical sidelink feedback channel resources, a physical sidelink feedback channel resource corresponding to the second terminal device a.

S202b: The second terminal device b receives the multicast information from the first terminal device. The second terminal device b determines, based on a total quantity of terminal devices in a multicast group and a resource group of physical sidelink feedback channel resources, a physical sidelink feedback channel resource corresponding to the second terminal device b.

S203a: The second terminal device a sends feedback information to the first terminal device based on the physical sidelink feedback channel resource corresponding to the second terminal device a.

S203b: The second terminal device b sends feedback information to the first terminal device based on the physical sidelink feedback channel resource corresponding to the second terminal device b.

Correspondingly, the first terminal device determines, based on a total quantity of terminal devices in a multicast group and a resource group of physical sidelink feedback channel resources, a physical sidelink feedback channel resource corresponding to each second terminal device. The first terminal device receives, based on the physical sidelink feedback channel resource corresponding to each second terminal device, feedback information sent by each of the at least two second terminal devices.

The first terminal device may determine, by using but not limited to the following three possible designs, the physical sidelink feedback channel resource corresponding to each second terminal device. It should be understood that the following three possible designs may be used separately or in combination. A first possible design may be used in combination with a second possible design, or a first possible design may be used in combination with a third possible design.

The first possible design is as follows:

The first terminal device determines, based on the total quantity of terminal devices in the multicast group and a quantity Ni of PRBs occupied by the resource group of the physical sidelink feedback channel resources, a PRB occupied by the physical sidelink feedback channel resource corresponding to each second terminal device.

The following separately describes, based on two different scenarios in which Ni≥2M and Ni<2M, a method for determining, by the first terminal device based on the total quantity of terminal devices and the quantity Ni of PRBs occupied by the resource group of the physical sidelink feedback channel resources, the PRB occupied by the physical sidelink feedback channel resource corresponding to each second terminal device. Ni represents the quantity of physical resource blocks PRBs occupied by the resource group of the physical sidelink feedback channel resources, and M represents the total quantity of terminal devices in the multicast group or the total quantity of terminal devices minus 1.

Scenario 1: Ni≥2M.

Solution 1: If Ni≥2M, PRB sequence numbers of PRBs occupied by the resource group of the physical sidelink feedback channel resources are sorted, and an $i^{th}$ terminal device in M terminal devices corresponds to an $i^{th}$ PRB and an $(i+1)^{th}$ PRB.

Figure 3A:
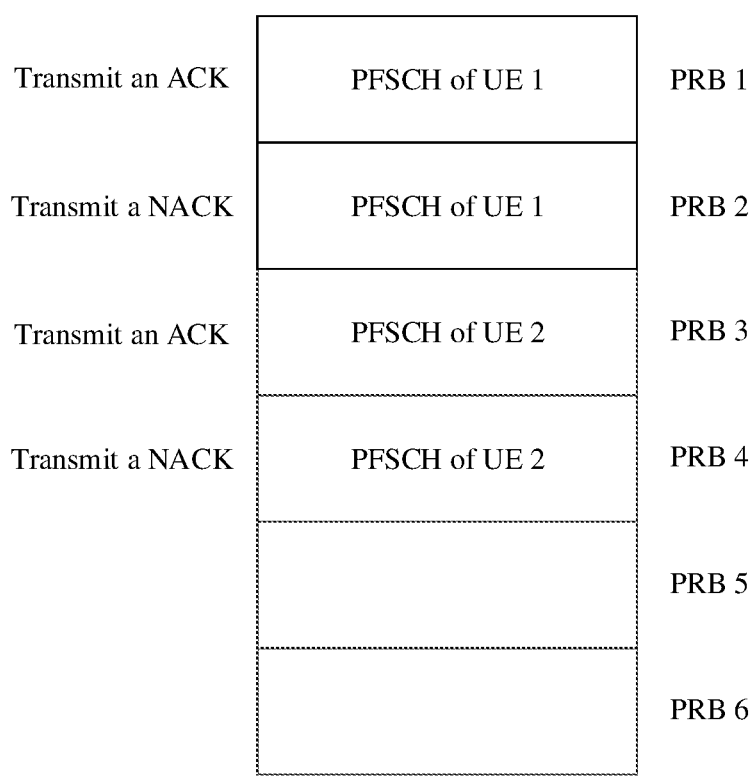
FIG. 3(a) is a schematic diagram 1 of a PRB occupied by a PSFCH resource allocated to UE in multicast.

For example, it is assumed that Ni=6, M=2, and the PRB sequence numbers of the PRBs occupied by the resource group of the physical sidelink feedback channel resources are sorted, to obtain a PRB 1, a PRB 2, a PRB 3, a PRB 4, a PRB 5, and a PRB 6. In this case, a physical sidelink feedback channel resource corresponding to a first terminal device occupies the PRB 1 and the PRB 2, where the PRB 1 is used to carry an ACK, and the PRB 2 is used to carry a NACK; and a physical sidelink feedback channel resource corresponding to a second terminal device occupies the PRB 3 and the PRB 4, where the PRB 3 is used to carry an ACK, and the PRB 4 is used to carry a NACK, as shown in FIG. 3(a). Alternatively, a physical sidelink feedback channel resource corresponding to a first terminal device occupies the PRB 1 and the PRB 2, where the PRB 1 is used to carry a NACK, and the PRB 2 is used to carry an ACK; and a physical sidelink feedback channel resource corresponding to a second terminal device occupies the PRB 3 and the PRB 4, where the PRB 3 is used to carry a NACK, and the PRB 4 is used to carry an ACK.

Solution 2: If Ni≥2M, PRB sequence numbers of PRBs occupied by the resource group of the physical sidelink feedback channel resources are sorted, and an $i^{th}$ terminal device in M terminal devices corresponds to an $i^{th}$ PRB and an $(Ni-i+1)^{th}$ PRB.

Figure 3B:
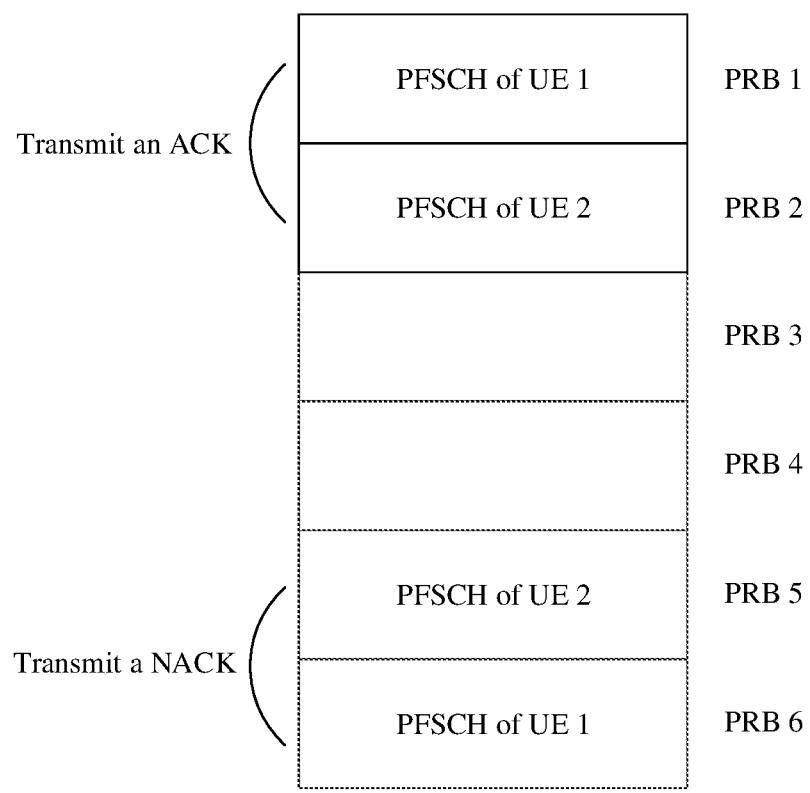
FIG. 3(b) is a schematic diagram 2 of a PRB occupied by a PSFCH resource allocated to UE in multicast.

For example, it is assumed that Ni=6, M=2, and the PRB sequence numbers of the PRBs occupied by the resource group of the physical sidelink feedback channel resources are sorted, to obtain a PRB 1, a PRB 2, a PRB 3, a PRB 4, a PRB 5, and a PRB 6. In this case, a physical sidelink feedback channel resource corresponding to a first terminal device occupies the PRB 1 and the PRB 6, where the PRB 1 is used to carry an ACK, and the PRB 6 is used to carry a NACK; and a physical sidelink feedback channel resource corresponding to a second terminal device occupies the PRB 2 and the PRB 5, where the PRB 2 is used to carry an ACK, and the PRB 5 is used to carry a NACK, as shown in FIG. 3(b). Alternatively, a physical sidelink feedback channel resource corresponding to a first terminal device occupies the PRB 1 and the PRB 6, where the PRB 1 is used to carry a NACK, and the PRB 6 is used to carry an ACK; and a physical sidelink feedback channel resource corresponding to a second terminal device occupies the PRB 2 and the PRB 5, where the PRB 2 is used to carry a NACK, and the PRB 5 is used to carry an ACK.

Figure 3C:
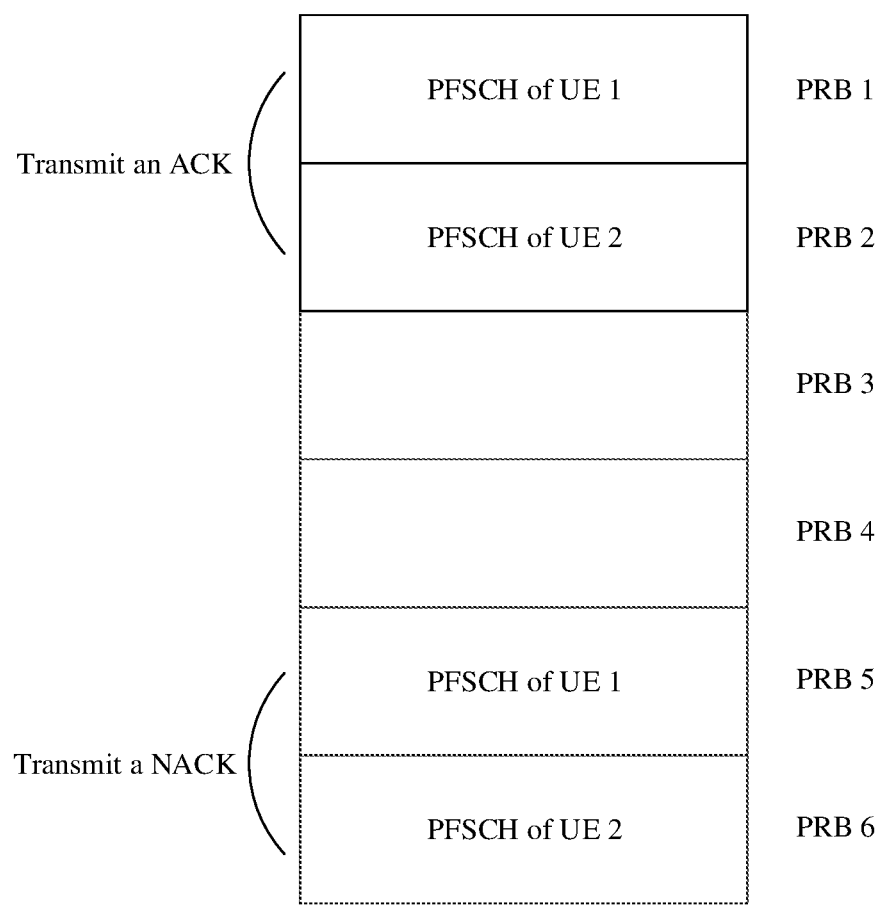
FIG. 3(c) is a schematic diagram 3 of a PRB occupied by a PSFCH resource allocated to UE in multicast.

It should be understood that, in addition to the foregoing two possible solutions, there is another possible solution. As shown in FIG. 3(c), it is assumed that Ni=6, M=2, and the PRB sequence numbers of the PRBs occupied by the resource group of the physical sidelink feedback channel resources are sorted, to obtain a PRB 1, a PRB 2, a PRB 3, a PRB 4, a PRB 5, and a PRB 6. In this case, a PSFCH resource of first UE that carries an ACK is on the PRB 1, and a PSFCH resource of a second UE that carries an ACK is on the PRB 2; and a PSFCH resource of the first UE that carries a NACK is on the PRB 5, and a PSFCH resource of the second UE that carries a NACK is on the PRB 6.

Scenario 2: Ni<2M.

Solution 1: If Ni<2M, and Ni is an even number, the PRB sequence numbers of the PRBs occupied by the resource group of the physical sidelink feedback channel resources are sorted, where Ni/2 PRBs with the first Ni/2 PRB sequence numbers carry an ACK, and Ni/2 PRBs with the remaining Ni/2 PRB sequence numbers carry a NACK; or Ni/2 PRBs with the first Ni/2 PRB sequence numbers carry a NACK, and Ni/2 PRBs with the remaining Ni/2 PRB sequence numbers carry an ACK.

For example, it is assumed that Ni=4, M=5, and the PRB sequence numbers of the PRBs occupied by the resource group of the physical sidelink feedback channel resources are sorted, to obtain a PRB 1, a PRB 2, a PRB 3, and a PRB 4. In this case, the PRB 1 and the PRB 2 are used to carry an ACK, and the PRB 3 and the PRB 4 are used to carry a NACK; or the PRB 1 and the PRB 2 are used to carry a NACK, and the PRB 3 and the PRB 4 are used to carry an ACK.

Solution 2: If Ni<2M, and Ni is an odd number, the PRB sequence numbers of the PRBs occupied by the resource group of the physical sidelink feedback channel resources are sorted, where $\lfloor N_i/2 \rfloor$ PRBs with the first $\lfloor N_i/2 \rfloor$ PRB sequence numbers carry an ACK, $\lfloor N_i/2 \rfloor$ PRBs with the remaining $\lfloor N_i/2 \rfloor$ PRB sequence numbers carry a NACK, and one PRB with an $(\lfloor N_i/2 \rfloor+1)^{th}$ PRB sequence number carries an ACK and a NACK; or $\lfloor N_i/2 \rfloor$ PRBs with the first $\lfloor N_i/2 \rfloor$ PRB sequence numbers carry a NACK, $\lfloor N_i/2 \rfloor$ PRBs with the remaining $\lfloor N_i/2 \rfloor$ PRB sequence numbers carry an ACK, and one PRB with an $(\lfloor N_i/2 \rfloor+1)^{th}$ PRB sequence number carries an ACK and a NACK.

For example, it is assumed that Ni=5, M=6, and the PRB sequence numbers of the PRBs occupied by the resource group of the physical sidelink feedback channel resources are sorted, to obtain a PRB 1, a PRB 2, a PRB 3, a PRB 4, and a PRB 5. In this case, the PRB 1 and the PRB 2 are used to carry an ACK, the PRB 3 is used to carry an ACK and a NACK, and the PRB 4 and the PRB 5 are used to carry a NACK; or the PRB 1 and the PRB 2 are used to carry a NACK, the PRB 3 is used to carry an ACK and a NACK, and the PRB 4 and the PRB 5 are used to carry an ACK.

In the foregoing design, a probability of retransmission caused by false detection can be reduced, and reliability of a physical sidelink feedback channel resource can be ensured.

The second possible design is as follows:

The first terminal device determines, based on the total quantity of terminal devices in the multicast group and the quantity Ni of PRBs occupied by the resource group, a minimum sequence interval corresponding to the resource group. Alternatively, the first terminal device receives indication information from a network device or another terminal device, where the indication information indicates the minimum sequence interval corresponding to the resource group. The first terminal device determines, based on the minimum sequence interval corresponding to the resource group, a sequence corresponding to the physical sidelink feedback channel resource corresponding to each second terminal device.

The minimum sequence interval corresponding to the resource group is a minimum value in minimum sequence intervals corresponding to all of the Ni PRBs, and the minimum sequence interval corresponding to each PRB is a minimum value in intervals of any two sequences in each PRB.

The following separately describes, based on two different scenarios in which Ni≥2M and Ni<2M, a method for determining, by the first terminal device based on the total quantity of terminal devices and the quantity Ni of PRBs occupied by the resource group of the physical sidelink feedback channel resources, the sequence corresponding to the physical sidelink feedback channel resource corresponding to each second terminal device. Ni represents the quantity of physical resource blocks PRBs occupied by the resource group of the physical sidelink feedback channel resources, M represents the total quantity of terminal devices in the multicast group or the total quantity of terminal devices minus 1, and $N_{sc}$ represents a total quantity of sequences.

Scenario 1: Ni≥2M.

If Ni≥2M, the minimum sequence interval is $N_{sc}$. In the foregoing scenario, the quantity of PRBs is greater than or equal to a quantity of required physical sidelink feedback channel resources. Therefore, in the Ni PRBs, a maximum of one sequence is used on each PRB, and the sequence is the sequence corresponding to the physical sidelink feedback channel resource.

Scenario 2: Ni<2M.

If Ni<2M, a minimum sequence interval corresponding to each of x PRBs is the minimum sequence interval $\Delta_1$ corresponding to the resource group, and a minimum sequence interval corresponding to each of the remaining (Ni−x) PRBs is 42.

$$\Delta_2 = \lfloor (2 \times M - x \times \lfloor N_{sc}/\Delta_1 \rfloor)/(N_i - x) \rfloor, \text{ or}$$

$$\Delta_1 = \lfloor (2 \times M - (N_i - x) \times \lfloor N_{sc}/\Delta_2 \rfloor)/x \rfloor,$$

where x is a positive integer.

It should be understood that the x PRBs and the remaining (Ni−x) PRBs meet the following constraint condition:

$$x \times \lfloor N_{sc}/\Delta_1 \rfloor + (N_i - x) \times \lfloor N_{sc}/\Delta_2 \rfloor = 2 \times M.$$

Further, $\Delta_1$ and $\Delta_2$ may be determined by using the following solution:

If Ni<2M, a minimum sequence interval corresponding to each of $$\left(2 \times M - N_i \times \left\lfloor \frac{2 \times M}{N_i} \right\rfloor\right)$$

PRBs is the minimum sequence interval $$\Delta_1 = \left\lfloor \frac{N_{sc}}{\left\lceil \frac{2 \times M}{N_i} \right\rceil} \right\rfloor$$

corresponding to the resource group, and a minimum sequence interval corresponding to each of the remaining $$\left(N_i - \left(2 \times M - N_i \times \left\lfloor \frac{2 \times M}{N_i} \right\rfloor\right)\right)$$

PRBs is $$\Delta_2 = \left\lfloor \frac{N_{sc}}{\left\lfloor \frac{2 \times M}{N_i} \right\rfloor} \right\rfloor, \text{ where } x = 2 \times M - N_i \times \left\lfloor \frac{2 \times M}{N_i} \right\rfloor.$$

$\Delta_1$ determined in the foregoing solution may maximize the minimum sequence interval corresponding to the resource group, so that a physical sidelink feedback channel resource can be effectively allocated.

The first terminal device may obtain a candidate sequence group through the foregoing calculation. The sequence group includes 2M sequences, and the 2M sequences are selected from code domain resources (that is, $N_{sc}$) carried on the Ni PRBs.

In an example, it is assumed that Ni=4, M=5, and the PRB sequence numbers of the PRBs occupied by the resource group of the physical sidelink feedback channel resources are sorted, to obtain a PRB 1, a PRB 2, a PRB 3, and a PRB 4. The following equations may be obtained in the foregoing manner $$2 \times M - N_i \times \left\lfloor \frac{2 \times M}{N_i} \right\rfloor = 2, \Delta_1 = \left\lfloor \frac{N_{sc}}{\left\lceil \frac{2 \times M}{N_i} \right\rceil} \right\rfloor = 4, \text{ and}$$

$$N_i - \left(2 \times M - N_i \times \left\lfloor \frac{2 \times M}{N_i} \right\rfloor\right) = 2, \text{ and } \Delta_2 = \left\lfloor \frac{N_{sc}}{\left\lfloor \frac{2 \times M}{N_i} \right\rfloor} \right\rfloor = 6,$$

where
in two PRBs, a minimum sequence interval corresponding to each PRB is 6, and in two PRBs, a minimum sequence interval corresponding to each PRB is the minimum sequence interval corresponding to the resource group, that is, 4.

Figure 4:
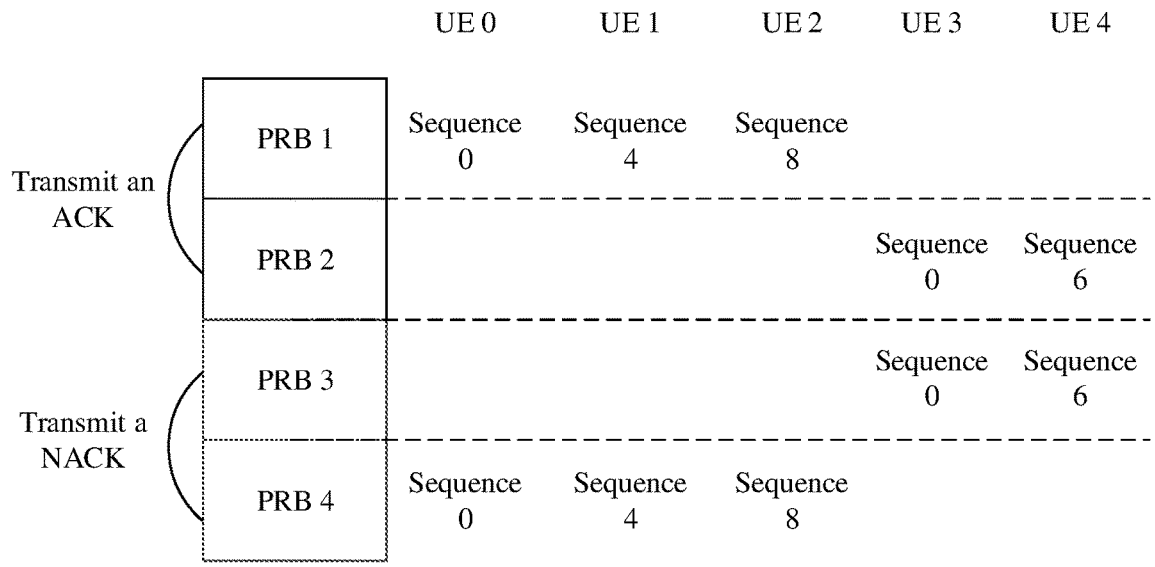
FIG. 4 is a schematic diagram 1 of a sequence corresponding to a PSFCH resource allocated to UE in multicast.

As shown in FIG. 4, a sequence 0, a sequence 4, and a sequence 8 are used on two PRBs, and a sequence 0 and a sequence 6 are used on the remaining two PRBs.

In another example, it is assumed that Ni=5, M=6, and the PRB sequence numbers of the PRBs occupied by the resource group of the physical sidelink feedback channel resources are sorted, to obtain a PRB 1, a PRB 2, a PRB 3, a PRB 4, and a PRB 5. The following equations may be obtained in the foregoing manner $$2 \times M - N_i \times \left\lfloor \frac{2 \times M}{N_i} \right\rfloor = 3, \Delta_1 = \left\lfloor \frac{N_{sc}}{\left\lceil \frac{2 \times M}{N_i} \right\rceil} \right\rfloor = 4, \text{ and}$$

$$N_i - \left(2 \times M - N_i \times \left\lfloor \frac{2 \times M}{N_i} \right\rfloor\right) = 2, \text{ and } \Delta_2 = \left\lfloor \frac{N_{sc}}{\left\lfloor \frac{2 \times M}{N_i} \right\rfloor} \right\rfloor = 6,$$

where
in three PRBs, a minimum sequence interval corresponding to each PRB is 6, and in two PRBs, a minimum sequence interval corresponding to each PRB is the minimum sequence interval corresponding to the resource group, that is, 4.

Figure 5:
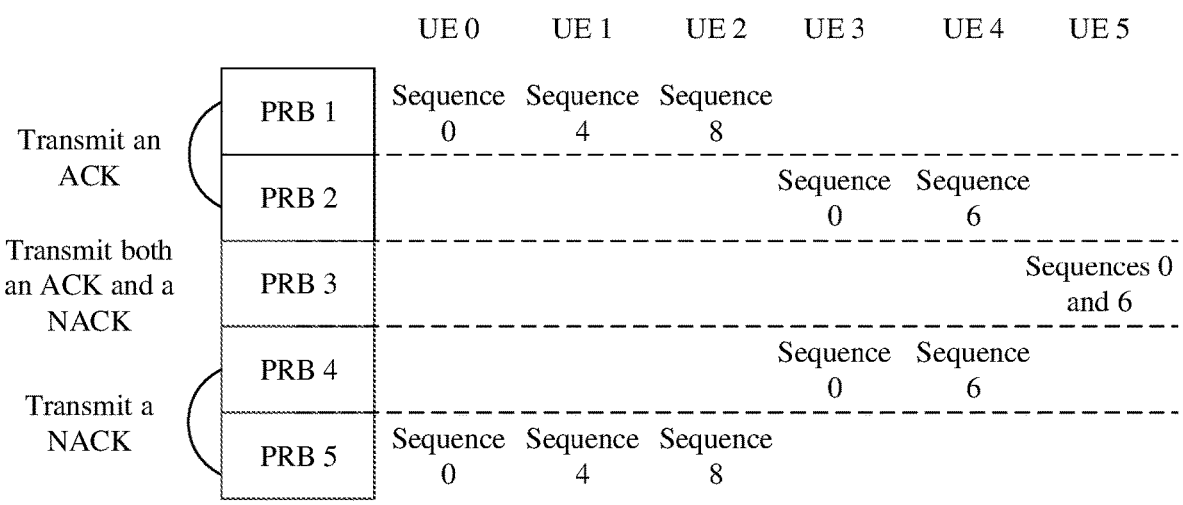
FIG. 5 is a schematic diagram 2 of a sequence corresponding to a PSFCH resource allocated to UE in multicast.

As shown in FIG. 5, a sequence 0, a sequence 4, and a sequence 8 are used on two PRBs, and a sequence 0 and a sequence 6 are used on the remaining 3 PRBs.

It should be understood that the allocation solutions shown in FIG. 4 and FIG. 5 are merely examples and are not intended to limit.

Further, this may include but is not limited to the following three manners of determining a sequence corresponding to a physical sidelink feedback channel resource corresponding to the $i^{th}$ terminal device. It should be understood that the $i^{th}$ terminal device is any one of the M terminal devices, and the sequence corresponding to the physical sidelink feedback channel resource corresponding to the $i^{th}$ terminal device includes two sequences that are used to carry an ACK and a NACK.

Manner 1: Sequential Selection

The $i^{th}$ terminal device respectively uses a $(2i-1)^{th}$ sequence and a $2i^{th}$ sequence to carry an ACK and a NACK. For example, the $i^{th}$ terminal device uses the $(2i-1)^{th}$ sequence to carry the ACK, and uses the $2i^{th}$ sequence to carry the NACK; or the $i^{th}$ terminal device uses the $(2i-1)^{th}$ sequence to carry the NACK, and uses the $2i^{th}$ sequence to carry the ACK.

Manner 2: Symmetric Selection

The $i^{th}$ terminal device respectively uses an $i^{th}$ sequence and a $(2M-i+1)^{th}$ sequence to carry an ACK and a NACK. For example, the $i^{th}$ terminal device uses the $i^{th}$ sequence to carry the ACK, and uses the $(2M-i+1)^{th}$ sequence to carry the NACK; or the $i^{th}$ terminal device uses the $i^{th}$ sequence to carry the NACK, and uses the $(2M-i+1)^{th}$ sequence to carry the ACK.

Manner 3: Reverse Selection

The $i^{th}$ terminal device respectively uses a $(2M-2i+1)^{th}$ sequence and a $(2M-2i+2)^{th}$ sequence to carry an ACK and a NACK. For example, the $i^{th}$ terminal device uses the $(2M-2i+1)^{th}$ sequence to carry the ACK, and uses the $(2M-2i+2)^{th}$ sequence to carry the NACK; or the $i^{th}$ terminal device uses the $(2M-2i+2)^{th}$ sequence to carry the NACK, and uses the $(2M-2i+1)^{th}$ sequence to carry the ACK.

It should be understood that the foregoing three manners are also applicable to determining, by any one of the M terminal devices (including the first terminal device and the second terminal device), a sequence corresponding to a physical sidelink feedback channel resource corresponding to the terminal device.

For example, Ni=4, $\Delta_1$=6, and $\Delta_2$=4. A sequence arrangement manner is: sequences 0, 4, and 8 on a first PRB, sequences 0 and 6 on a second PRB, sequences 0 and 6 on a third PRB, and sequences 0, 4, and 8 on a fourth PRB. It should be understood that another sequence arrangement manner may be obtained by adjusting an order of PRBs. Only one of the foregoing three manners is used in the standard. Therefore, there is no need to perform selection between the manners.

For example, when sequential selection is used, UE with a smallest number in the multicast group uses the sequences 0 and 4 on the first PRB, where the sequence 0 carries an ACK, and the sequence 4 carries a NACK, or vice versa; and UE with a second smallest number uses the sequence 8 on the first PRB and the sequence 0 on the second PRB, where the sequence 8 carries an ACK, and the sequence 0 carries a NACK, or vice versa.

For example, when symmetric selection is used, UE with a smallest number in the multicast group uses the sequence 0 on the first PRB and the sequence 0 on the fourth PRB, where the sequence 0 on the first PRB carries an ACK, and the sequence 0 on the fourth PRB carries a NACK, or vice versa; and UE with a second smallest number uses the sequence 4 on the first PRB and the sequence 4 on the fourth PRB, where the sequence 4 on the first PRB carries an ACK, and the sequence 4 on the fourth PRB carries a NACK, or vice versa.

Alternatively, when symmetric selection is used, UE with a smallest number in the multicast group uses the sequence 0 on the first PRB and the sequence 8 on the fourth PRB, where the sequence 0 on the first PRB carries an ACK, and the sequence 8 on the fourth PRB carries a NACK, or vice versa; and UE with a second smallest number uses the sequence 4 on the first PRB and the sequence 4 on the fourth PRB, where the sequence 4 on the first PRB carries an ACK, and the sequence 4 on the fourth PRB carries a NACK, or vice versa.

For example, when reverse selection is used, UE with a smallest number in the multicast group uses the sequence 0 on the fourth PRB and the sequence 4 on the fourth PRB, where the sequence 0 on the fourth PRB carries an ACK, and the sequence 4 on the fourth PRB carries a NACK, or vice versa; and UE with a second smallest number uses the sequence 8 on the fourth PRB and the sequence 0 on the third PRB, where the sequence 8 on the fourth PRB carries an ACK, and the sequence 0 on the third PRB carries a NACK, or vice versa.

Alternatively, when reverse selection is used, UE with a smallest number in the multicast group uses the sequence 8 on the fourth PRB and the sequence 4 on the fourth PRB, where the sequence 8 on the fourth PRB carries an ACK, and the sequence 4 on the fourth PRB carries a NACK, or vice versa; and UE with a second smallest number uses the sequence 0 on the fourth PRB and the sequence 6 on the third PRB, where the sequence 0 on the fourth PRB carries an ACK, and the sequence 6 on the third PRB carries a NACK, or vice versa.

It should be understood that the foregoing examples are not intended to limit.

The third possible design is as follows:

The following separately describes, based on two different scenarios in which Ni≥2M and Ni<2M, a method for determining, by the first terminal device based on the total quantity of terminal devices in the multicast group and the quantity Ni of PRBs occupied by the resource group of the physical sidelink feedback channel resources, the sequence corresponding to the physical sidelink feedback channel resource corresponding to each second terminal device. Ni represents the quantity of physical resource blocks PRBs occupied by the resource group of the physical sidelink feedback channel resources, M represents the total quantity of terminal devices in the multicast group or the total quantity of terminal devices minus 1, and $N_{sc}$ represents a total quantity of sequences.

Scenario 1: Ni≥2M.

If Ni≥2M, the minimum sequence interval is $N_{sc}$. In the foregoing scenario, the quantity of PRBs is greater than or equal to a quantity of required physical sidelink feedback channel resources. Therefore, in the Ni PRBs, a maximum of one sequence is used on each PRB, and the sequence is the sequence corresponding to the physical sidelink feedback channel resource.

Scenario 2: Ni<2M.

If Ni<2M, and a product of a first sequence quantity $$\left\lfloor \frac{2 \times M}{N_i} \right\rfloor$$

and Ni is not equal to 2M, the second terminal device determines that the first sequence quantity is $$\left\lfloor \frac{2 \times M}{N_i} \right\rfloor$$

and a second sequence quantity is $$\left\lceil \frac{2 \times M}{N_i} \right\rceil.$$

The second terminal device determines, based on the first sequence quantity, the second sequence quantity, and a mapping relationship between a sequence quantity and a sequence cyclic shift index combination, a sequence cyclic shift index combination corresponding to the first sequence quantity and a sequence cyclic shift index combination corresponding to the second sequence quantity. The second terminal device determines, based on the identifier of the second terminal device, the sequence cyclic shift index combination corresponding to the first sequence quantity, and the sequence cyclic shift index combination corresponding to the second sequence quantity, a sequence corresponding to the physical sidelink feedback channel resource corresponding to the second terminal device.

If Ni<2M, and a product of a first sequence quantity $$\left\lfloor \frac{2 \times M}{N_i} \right\rfloor$$

and Ni is equal to 2M, the second terminal device determines that the first sequence quantity is $$\left\lfloor \frac{2 \times M}{N_i} \right\rfloor.$$

The second terminal device determines, based on the first sequence quantity and a mapping relationship between a sequence quantity and a sequence cyclic shift index combination, a sequence cyclic shift index combination corresponding to the first sequence quantity. The second terminal device determines, based on the identifier of the second terminal device and the sequence cyclic shift index combination corresponding to the first sequence quantity, a sequence corresponding to the physical sidelink channel resource corresponding to the second terminal device.

In an example, as shown in Table 1(a) and Table 1(b), the mapping relationship between a sequence quantity and a sequence cyclic shift index combination includes:

If the sequence quantity is 2, the sequence cyclic shift index combination is 0 and 6.

Alternatively, if the sequence quantity is 3, the sequence cyclic shift index combination is 0, 4, and 8.

Alternatively, if the sequence quantity is 4, the sequence cyclic shift index combination is 0, 3, 6, and 9.

Alternatively, if the sequence quantity is 5, the sequence cyclic shift index combination is 0, 2, 4, 6, and 9.

Alternatively, if the sequence quantity is 6, the sequence cyclic shift index combination is 0, 2, 4, 6, 8, and 10.

Alternatively, if the sequence quantity is 7, the sequence cyclic shift index combination is 0, 1, 2, 4, 6, 8, and 10.

Alternatively, if the sequence quantity is 8, the sequence cyclic shift index combination is 0, 1, 2, 3, 4, 6, 8, and 10.

Alternatively, if the sequence quantity is 9, the sequence cyclic shift index combination is 0, 1, 2, 3, 4, 5, 6, 8, and 10.

Alternatively, if the sequence quantity is 10, the sequence cyclic shift index combination is 0, 1, 2, 3, 4, 5, 6, 7, 8, and 10.

Alternatively, if the sequence quantity is 11, the sequence cyclic shift index combination is 0, 1, 2, 3, 4, 5, 6, 7, 8, 9, and 10.

Alternatively, if the sequence quantity is 12, the sequence cyclic shift index combination is 0, 1, 2, 3, 4, 5, 6, 7, 8, 9, 10, and 11.

In another example, as shown in Table 2(a) and Table 2(b), the mapping relationship between a sequence quantity and a sequence cyclic shift index combination includes:

If the sequence quantity is 2, the sequence cyclic shift index combination is 0 and 6.

Alternatively, if the sequence quantity is 3, the sequence cyclic shift index combination is 0, 4, and 8.

Alternatively, if the sequence quantity is 4, the sequence cyclic shift index combination is 0, 3, 6, and 9.

Alternatively, if the sequence quantity is 5, the sequence cyclic shift index combination is 0, 3, 6, 8, and 10.

Alternatively, if the sequence quantity is 6, the sequence cyclic shift index combination is 0, 2, 4, 6, 8, and 10.

Alternatively, if the sequence quantity is 7, the sequence cyclic shift index combination is 0, 2, 4, 6, 8, 10, and 11.

Alternatively, if the sequence quantity is 8, the sequence cyclic shift index combination is 0, 2, 4, 6, 8, 9, 10, and 11.

Alternatively, if the sequence quantity is 9, the sequence cyclic shift index combination is 0, 2, 4, 6, 7, 8, 9, 10, and 11.

Alternatively, if the sequence quantity is 10, the sequence cyclic shift index combination is 0, 2, 4, 5, 6, 7, 8, 9, 10, and 11.

Alternatively, if the sequence quantity is 11, the sequence cyclic shift index combination is 0, 2, 3, 4, 5, 6, 7, 8, 9, 10, and 11.

Alternatively, if the sequence quantity is 12, the sequence cyclic shift index combination is 0, 1, 2, 3, 4, 5, 6, 7, 8, 9, 10, and 11.

TABLE 1(a)

| Sequence quantity | Sequence example |
| --- | --- |
| 2 | 0 and 6, where a minimum interval is 6 |
| 3 | 0, 4, and 8, where a minimum interval is 4 |
| 4 | 0, 3, 6, and 9, where a minimum interval is 3 |
| 5 | 0, 2, 4, 6, and 9, where a minimum interval is 2 |
| 6 | 0, 2, 4, 6, 8, and 10, where a minimum interval is 2 |
| 7 | 0, 1, 2, 4, 6, 8, and 10, where a minimum interval is 1 |
| 8 | 0, 1, 2, 3, 4, 6, 8, and 10, where a minimum interval is 1 |
| 9 | 0, 1, 2, 3, 4, 5, 6, 8, and 10, where a minimum interval is 1 |
| 10 | 0, 1, 2, 3, 4, 5, 6, 7, 8, and 10, where a minimum interval is 1 |
| 11 | 0, 1, 2, 3, 4, 5, 6, 7, 8, 9, and 10, where a minimum interval is 1 |
| 12 | 0, 1, 2, 3, 4, 5, 6, 7, 8, 9, 10, and 11, where a minimum interval is 1 |

TABLE 1(b)

| Sequence quantity | Sequence example |
| --- | --- |
| 2 | 0 and 6 |
| 3 | 0, 4, and 8 |
| 4 | 0, 3, 6, and 9 |
| 5 | 0, 2, 4, 6, and 9 |
| 6 | 0, 2, 4, 6, 8, and 10 |
| 7 | 0, 1, 2, 4, 6, 8, and 10 |
| 8 | 0, 1, 2, 3, 4, 6, 8, and 10 |
| 9 | 0, 1, 2, 3, 4, 5, 6, 8, and 10 |
| 10 | 0, 1, 2, 3, 4, 5, 6, 7, 8, and 10 |
| 11 | 0, 1, 2, 3, 4, 5, 6, 7, 8, 9, and 10 |
| 12 | 0, 1, 2, 3, 4, 5, 6, 7, 8, 9, 10, and 11 |

TABLE 2(a)

| Sequence quantity | Sequence example |
| --- | --- |
| 2 | 0 and 6, where a minimum interval is 6 |
| 3 | 0, 4, and 8, where a minimum interval is 4 |
| 4 | 0, 3, 6, and 9, where a minimum interval is 3 |
| 5 | 0, 3, 6, 8, and 10, where a minimum interval is 2 |
| 6 | 0, 2, 4, 6, 8, and 10, where a minimum interval is 2 |
| 7 | 0, 2, 4, 6, 8, 10, and 11, where a minimum interval is 1 |
| 8 | 0, 2, 4, 6, 8, 9, 10, and 11, where a minimum interval is 1 |
| 9 | 0, 2, 4, 6, 7, 8, 9, 10, and 11, where a minimum interval is 1 |
| 10 | 0, 2, 4, 5, 6, 7, 8, 9, 10, and 11, where a minimum interval is 1 |

TABLE 2(a)-continued

| Sequence quantity | Sequence example |
| --- | --- |
| 11 | 0, 2, 3, 4, 5, 6, 7, 8, 9, 10, and 11, where a minimum interval is 1 |
| 12 | 0, 1, 2, 3, 4, 5, 6, 7, 8, 9, 10, and 11, where a minimum interval is 1 |

TABLE 2(b)

| Sequence quantity | Sequence example |
| --- | --- |
| 2 | 0 and 6 |
| 3 | 0, 4, and 8 |
| 4 | 0, 3, 6, and 9 |
| 5 | 0, 3, 6, 8, and 10 |
| 6 | 0, 2, 4, 6, 8, and 10 |
| 7 | 0, 2, 4, 6, 8, 10, and 11 |
| 8 | 0, 2, 4, 6, 8, 9, 10, and 11 |
| 9 | 0, 2, 4, 6, 7, 8, 9, 10, and 11 |
| 10 | 0, 2, 4, 5, 6, 7, 8, 9, 10, and 11 |
| 11 | 0, 2, 3, 4, 5, 6, 7, 8, 9, 10, and 11 |
| 12 | 0, 1, 2, 3, 4, 5, 6, 7, 8, 9, 10, and 11 |

It should be understood that Table 1 and Table 2 are merely examples but are not intended to limit. In addition to specifying, in a form of a table, the mapping relationship between a sequence quantity and a sequence cyclic shift index combination, Table 1 and Table 2 may alternatively be in another form. In addition to Table 1 and Table 2, there may be another mapping relationship between a sequence quantity and a sequence cyclic shift index combination. Table 1 and Table 2 are merely examples but are not intended to limit the embodiments.

For example, assuming that $N_i=4$, and $M=5$, the first sequence quantity $$\left\lceil \frac{2 \times M}{N_i} \right\rceil = \left\lceil \frac{10}{4} \right\rceil = 3.$$

and the second sequence quantity $$\left\lfloor \frac{2 \times M}{N_i} \right\rfloor = \left\lfloor \frac{10}{4} \right\rfloor = 2,$$

It can be learned from Table 1 that the sequences corresponding to the sequence quantity 2 are 0 and 6, and the sequences corresponding to the sequence quantity 3 are 0, 4, and 8. Assuming that $N_i=4$, and $M=4$, the first sequence quantity $$\left\lceil \frac{2 \times M}{N_i} \right\rceil = \left\lfloor \frac{8}{4} \right\rfloor = 2.$$

It can be learned from Table 1 that the sequences corresponding to the sequence quantity 2 are 0 and 6.

In addition, for specific content of S202a and S202b, refer to the descriptions of S204. Details are not described again.

Embodiment 2

A total quantity of terminal devices in a multicast group and a total quantity of terminal devices that need to feed back a message in the multicast group are not necessarily the same. For example, when UE in a group initiates multicast, only the remaining UEs in the group need to reply with a feedback message. Therefore, the total quantity of terminal devices that need to perform feedback in the multicast group is the total quantity of terminal devices in the multicast group minus 1. In this case, if PSFCH resources are allocated based on the total quantity of terminal devices in the multicast group, two additional PSFCH resources that do not need to be used need to be allocated. Consequently, a waste of resources is caused. In addition, a quantity of available sequences is reduced during allocation of the remaining sequences, and a bit error rate is increased.

Figure 6:
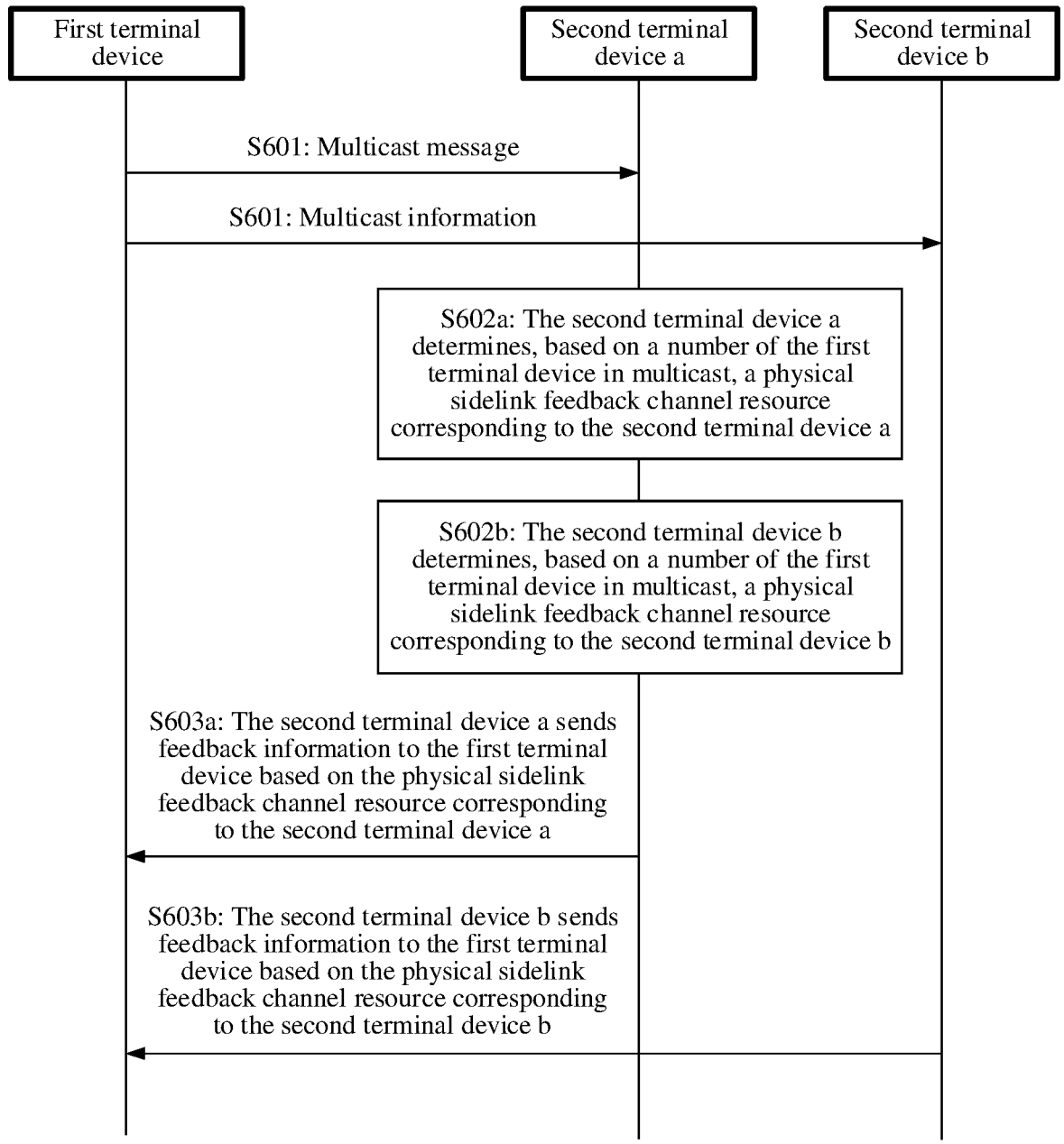
FIG. 6 is an overview flowchart 2 of a method for determining a physical sidelink feedback channel resource.

As shown in FIG. 6, an embodiment provides a method for determining a physical sidelink feedback channel resource. The method includes:

It should be noted that FIG. 6 shows only a second terminal device a and a second terminal device b in at least two second terminal devices. The following uses only the second terminal device a and the second terminal device b as an example for detailed description. For a specific processing process of another second terminal device, refer to the second terminal device a and the second terminal device b. Details are not repeated.

S601: A first terminal device sends multicast information to the at least two second terminal devices.

S602a: The second terminal device a receives the multicast information from the first terminal device. The second terminal device a determines, based on a number of the first terminal device in multicast, a physical sidelink feedback channel resource corresponding to the second terminal device a.

In a possible design, the second terminal device a generates a temporary number of the second terminal device a based on the number of the first terminal device in the multicast. The second terminal device a determines, based on the temporary number of the second terminal device, the physical sidelink feedback channel resource corresponding to the second terminal device. For example, the second terminal device a may determine, with reference to the temporary number of the second terminal device by using the method shown in Embodiment 1, the physical sidelink feedback channel resource corresponding to the second terminal device a. For example, it is assumed that M is equal to the total quantity of terminal devices in the multicast minus 1. In addition, the second terminal device a may further determine, based on the temporary number of the second terminal device a by using another method, the physical sidelink feedback channel resource corresponding to the second terminal device a.

For example, a number of UE that initiates multicast in the multicast is j, and numbers of the remaining UEs in the multicast are adjusted based on the number j, to obtain temporary numbers (temp UE ID):

$$temp\ UE\ ID = \begin{cases} UE\ ID, & \text{if } UE\ ID < j \\ UE\ ID - 1, & \text{if } UE\ ID > j \end{cases}.$$

Further, the remaining UEs in the multicast may determine corresponding physical sidelink feedback channel resources based on the temporary numbers.

In another possible design, the second terminal device a sorts the remaining second terminal devices in the multicast based on the number of the first terminal device in the multicast. The second terminal device a determines, based on a sorting result, the physical sidelink feedback channel resource corresponding to the second terminal device.

For example, a number of UE that initiates multicast in the multicast is j, and all of the remaining UEs in the multicast other than the UE whose number is j are sorted, but no temporary number is generated. Then, a physical sidelink feedback channel resource corresponding to each of the remaining UEs in the multicast is determined based on a sorting result.

For another example, a number of UE that initiates multicast in the multicast is j. In a formula for obtaining a physical sidelink feedback channel resource, a physical sidelink feedback channel resource corresponding to UE whose number is less than j is obtained by substituting the number of the UE into the formula, and a physical sidelink feedback channel resource corresponding to UE whose number is greater than j is obtained by substituting a calculation result of the number of the UE minus 1 into the formula.

It should be understood that basic ideas of the foregoing two designs are the same, and a difference lies in that a temporary number is generated in the first design, but no temporary number is generated in the second design.

S602b: The second terminal device b receives the multicast information from the first terminal device. The second terminal device a determines, based on a number of the first terminal device in multicast, a physical sidelink feedback channel resource corresponding to the second terminal device a.

S603a: The second terminal device a sends feedback information to the first terminal device based on the physical sidelink feedback channel resource corresponding to the second terminal device a.

S603b: The second terminal device b sends feedback information to the first terminal device based on the physical sidelink feedback channel resource corresponding to the second terminal device b.

Correspondingly, the first terminal device determines, based on a number of the first terminal device in multicast, a physical sidelink feedback channel resource corresponding to each second terminal device. The first terminal device receives, based on the physical sidelink feedback channel resource corresponding to each second terminal device, feedback information sent by each of the at least two second terminal devices.

Figure 7:
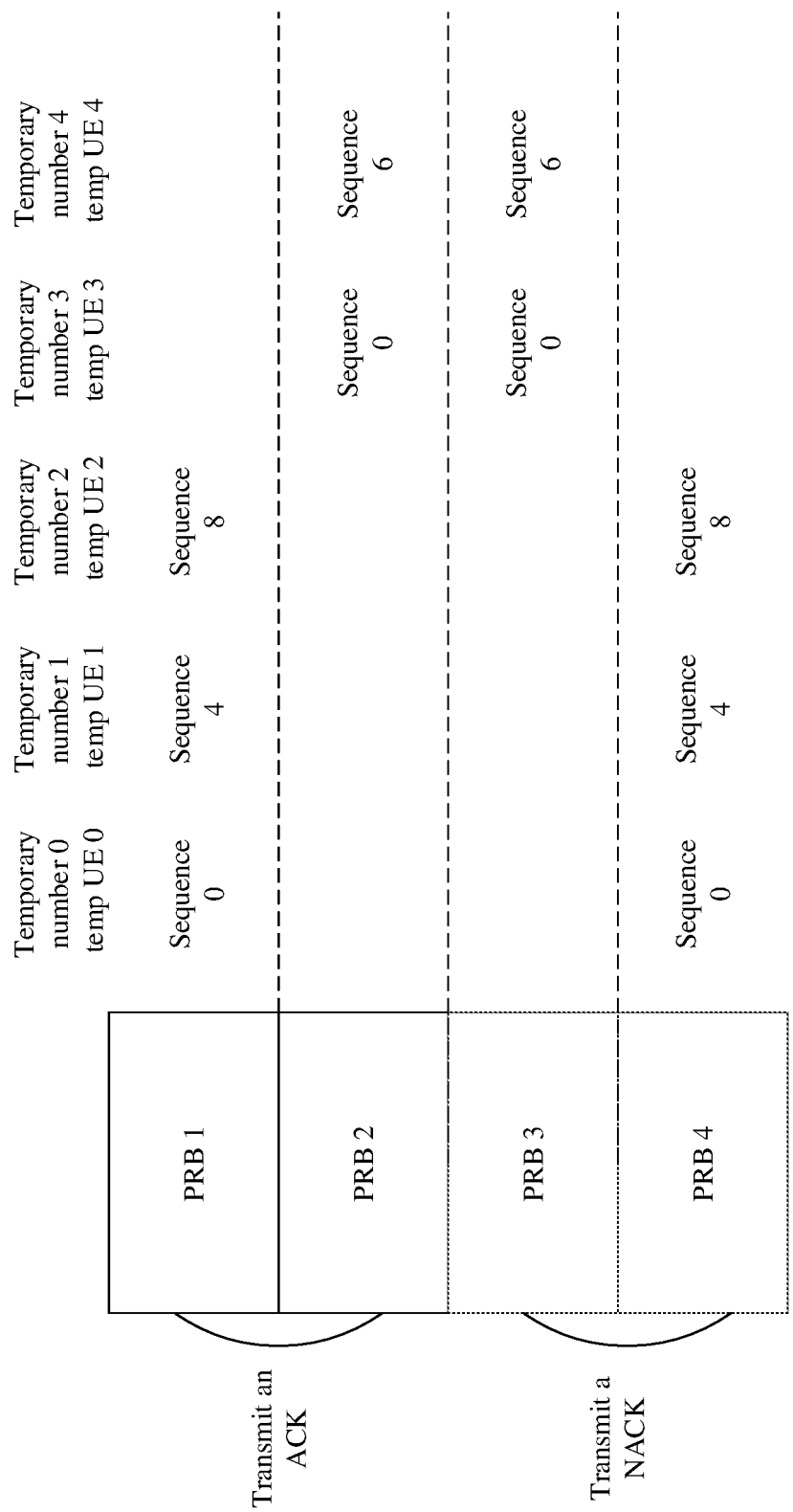
FIG. 7 is a schematic diagram of a PSFCH resource allocated to UE in multicast.

For example, assuming that Ni=4, and M=5, a sequence 0, a sequence 4, and a sequence 8 are used on two PRBs, and a sequence 0 and a sequence 6 are used on the remaining two PRBs. The sequence 0, the sequence 4, and the sequence 8 are used on a first PRB, and the sequence 0 and the sequence 6 are used on a second PRB, to serve as PSFCH resources for carrying an ACK, where these sequences correspond to five PSFCH resources for UE to carry an ACK. The sequence 0, the sequence 4, and the sequence 8 are used on a fourth PRB, and the sequence 0 and the sequence 6 are used on a second PRB, to serve as PSFCH resources for carrying a NACK, where these sequences correspond to five PSFCH resources for UE to carry a NACK. According to the sorting, as shown in FIG. 7, a table of a correspondence between UE and a sequence is shown in Table 3:

TABLE 3

| Temp UE ID | PSFCH resource |
| --- | --- |
| Temp UE 0 | A sequence 0 on a first PRB carries an ACK |
|  | A sequence 0 on a fourth PRB carries a NACK |
| Temp UE 1 | A sequence 4 on a first PRB carries an ACK |
|  | A sequence 4 on a fourth PRB carries a NACK |
| Temp UE 2 | A sequence 8 on a first PRB carries an ACK |
|  | A sequence 8 on a fourth PRB carries a NACK |
| Temp UE 3 | A sequence 0 on a second PRB carries an ACK |
|  | A sequence 0 on a third PRB carries a NACK |
| Temp UE 4 | A sequence 6 on a second PRB carries an ACK |
|  | A sequence 6 on a third PRB carries a NACK |

In the foregoing embodiment, resources can be saved, a quantity of used sequences can be reduced, and a bit error rate can be reduced.

Embodiment 3

According to a current standard progress, a periodicity of a PSFCH may be 1, 2, or 4, that is, the periodicity is one slot, two slots, or four slots. Considering that a requirement of a PSFCH resource for multicast is relatively high, if there is only one PSFCH symbol in four slots, it is very likely that the PSFCH resource needs to be multiplexed for multicast in the four slots, causing relatively high complexity. If PSFCH resources in different slots are multiplexed by using a frequency domain multiplexing (FDM) structure, it means that a quantity of PRB resources that can be used for each multicast is greatly reduced. To avoid the foregoing problem, the following design may be used, but is not limited to the following design:

In a possible design, if a periodicity of the resource group is greater than one slot, the first terminal device initiates one multicast transmission in the periodicity of the resource group.

In a possible design, if the periodicity of the resource group is greater than one slot, the first terminal device transmits the multicast information in the first slot in the periodicity of the resource group, and repeatedly transmits the multicast information in the remaining slots.

Optionally, a frequency domain resource used by the first terminal device to repeatedly transmit the multicast information in the remaining slots is the same as a frequency domain resource used by the first terminal device to transmit the multicast information in the first slot.

Figure 8:
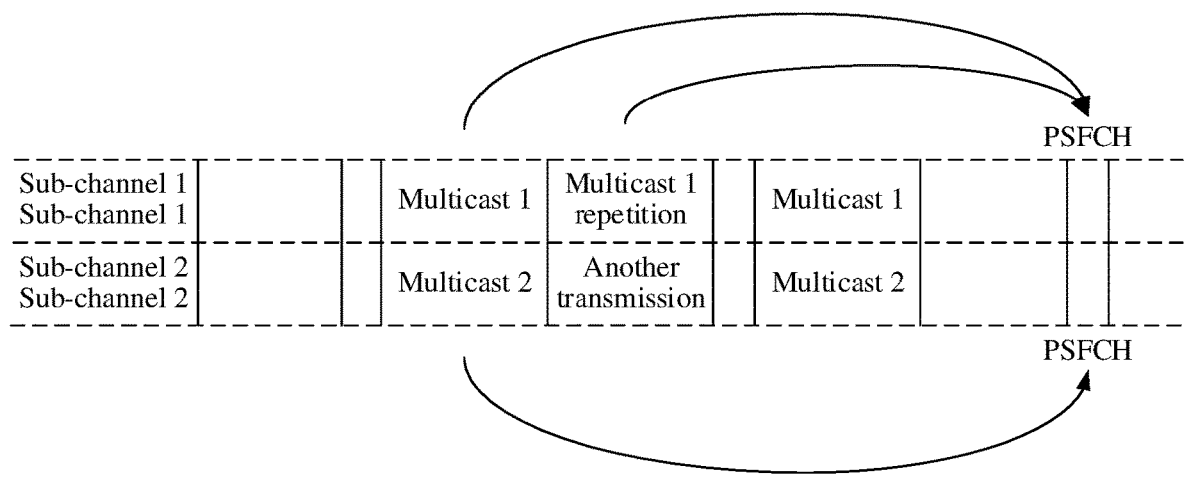
FIG. 8 is a schematic diagram of periodically transmitting multicast information on a PSFCH.

For example, as shown in FIG. 8, a periodicity of a PSFCH is two slots, only a first slot is used to transmit multicast information, and a second slot can be used to transmit only repeated multicast information.

The foregoing embodiments may be used separately, or may be used in combination, to achieve different effects.

In the foregoing embodiments, various solutions of the communication method are separately described from perspectives of each network element and interaction between the network elements. It may be understood that, to implement the foregoing functions, the network elements, such as the network device and the terminal device, include a corresponding hardware structure and/or software module for performing the functions. A person skilled in the art should be easily aware that, in combination with the examples of units and algorithm steps can be implemented by hardware or a combination of hardware and computer software. Whether a function is performed by hardware or hardware driven by computer software depends on particular applications and design constraints of the solutions. A person skilled in the art may use different methods to implement the described functions for each particular application, but it should not be considered that the implementation goes beyond the scope.

Figure 9:
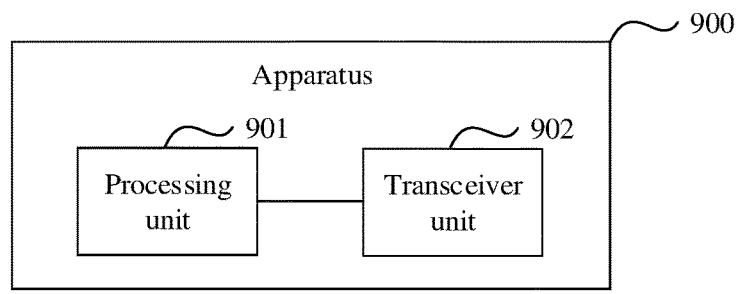
FIG. 9 is a schematic diagram 1 of a structure of an apparatus.

Based on a same concept, as shown in FIG. 9, an embodiment further provides an apparatus 900. The apparatus 900 includes a transceiver unit 902 and a processing unit 901.

In an example, the apparatus 900 is configured to implement a function of the first terminal device in the foregoing method. The apparatus may be the first terminal device or may be an apparatus in the first terminal device, for example, a chip system.

The transceiver unit 902 sends multicast information to at least two second terminal devices.

The processing unit 901 determines, based on a total quantity of terminal devices in a multicast group and a resource group of physical sidelink feedback channel resources, a physical sidelink feedback channel resource corresponding to each second terminal device.

The transceiver unit 902 receives, based on the physical sidelink feedback channel resource corresponding to each second terminal device, feedback information sent by each of the at least two second terminal devices.

In an example, the apparatus 900 is configured to implement a function of the second terminal device in the foregoing method. The apparatus may be the second terminal device or may be an apparatus in the second terminal device, for example, a chip system.

The transceiver unit 902 receives multicast information from a first terminal device.

The processing unit 901 determines, based on a total quantity of terminal devices in a multicast group and a resource group of physical sidelink feedback channel resources, a physical sidelink feedback channel resource corresponding to the second terminal device.

The transceiver unit 902 sends feedback information to the first terminal device based on the physical sidelink feedback channel resource corresponding to the second terminal device.

For specific execution processes of the processing unit 901 and the transceiver unit 902, refer to the descriptions in the foregoing method embodiments. In embodiments, division into modules is an example, and is merely logical function division. In actual implementation, there may be another division manner. In addition, function modules in embodiments may be integrated into one processor, or each of the modules may exist alone physically, or two or more modules may be integrated into one module. The foregoing integrated module may be implemented in a form of hardware or may be implemented in a form of a software function module.

In another optional variation, the apparatus may be a chip system. In embodiments, the chip system may include a chip, or may include a chip and another discrete component. For example, the apparatus includes a processor and an interface, and the interface may be an input/output interface. The processor implements functions of the processing unit 901, and the interface implements functions of the transceiver unit 902. The apparatus may further include a memory. The memory is configured to store a program that can be run on a processor. When the processor executes the program, the methods in the foregoing embodiments are performed.

Figure 10:
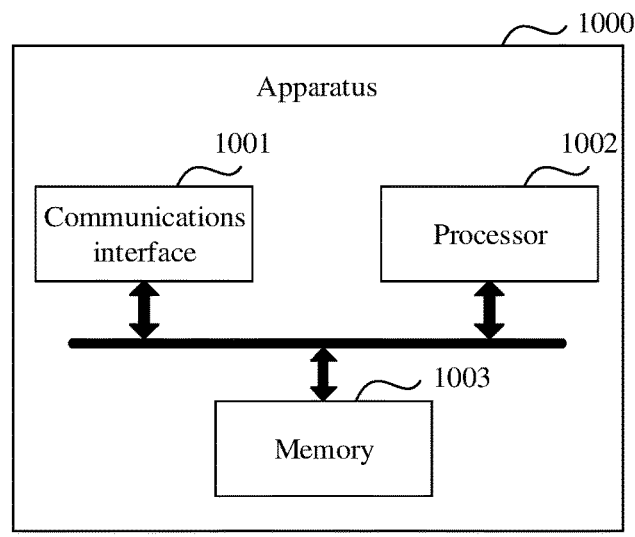
FIG. 10 is a schematic diagram 2 of a structure of an apparatus.

Based on a same concept, as shown in FIG. 10, an embodiment provides an apparatus 1000. The apparatus 1000 includes a communications interface 1001, at least one processor 1002, and at least one memory 1003. The communications interface 1001 is configured to communicate with another device by using a transmission medium, so that an apparatus in the apparatus 1000 can communicate with the another device. The memory 1003 is configured to store a computer program. The processor 1002 invokes the computer program stored in the memory 1003, to send and receive data through the communications interface 1001, to implement the methods in the foregoing embodiments.

For example, when the apparatus is a first terminal device, the memory 1003 is configured to store a computer program. The processor 1002 invokes the computer program stored in the memory 1003, to perform, through the communications interface 1001, the method performed by the first terminal device in the foregoing embodiment. When the apparatus is a second terminal device, the memory 1003 is configured to store a computer program. The processor 1002 invokes the computer program stored in the memory 1003, to perform, through the communications interface 1001, the method performed by the second terminal device in the foregoing embodiment.

In embodiments, the communications interface 1001 may be a transceiver, a circuit, a bus, a module, or a communications interface of another type. The processor 1002 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments. The general-purpose processor may be a microprocessor, any conventional processor, or the like. The steps of the methods disclosed with reference to embodiments may be directly presented as being performed and completed by a hardware processor or performed and completed by a combination of hardware and a software module in a processor. The memory 1003 may be a nonvolatile memory such as a hard disk drive (HDD) or a solid-state drive (SSD), or may be a volatile memory, for example, a random access memory (RAM). The memory is any other medium that can carry or store expected program code in a form of an instruction structure or a data structure and that can be accessed by a computer but is not limited thereto. The memory in embodiments may alternatively be a circuit or any other apparatus that can implement a storage function. The memory 1003 is coupled with the processor 1002. Coupling in embodiments may be indirect coupling or a communication connection between apparatuses, units, or modules in an electrical form, a mechanical form, or another form, and is used for information exchange between the apparatuses, the units, or the modules. In another implementation, the memory 1003 may alternatively be located outside the apparatus 1000. The processor 1002 may operate in cooperation with the memory 1003. The processor 1002 may execute the program instructions stored in the memory 1003. At least one of the at least one memory 1003 may alternatively be included in the processor 1002. In embodiments, a connection medium between the communications interface 1001, the processor 1002, and the memory 1003 is not limited. For example, in embodiments, the memory 1003, the processor 1002, and the communications interface 1001 may be connected through a bus in FIG. 10. The bus may be classified into an address bus, a data bus, a control bus, or the like.

It may be understood that the apparatus in the embodiment shown in FIG. 9 may be implemented by the apparatus 1000 shown in FIG. 10. For example, the processing unit 901 may be implemented by the processor 1002, and the transceiver unit 902 may be implemented by the communications interface 1001.

An embodiment further provides a computer-readable storage medium. The computer-readable storage medium stores a computer program. When the computer program is run on a computer, the computer is enabled to perform the methods according to the foregoing embodiments.

All or some of the methods provided in embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the procedures or functions according to embodiments are generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid-state drive (SSD)), or the like.

The foregoing embodiments are merely used to describe the solutions of the embodiments. The descriptions of the foregoing embodiments are merely intended to facilitate understanding of the method of the embodiments, and shall not be construed as a limitation on the embodiments. Variations or replacements readily figured out by a person skilled in the art shall fall within the scope of the embodiments.

What is claimed is:

1. A method for determining a physical sidelink feedback channel resource performed by a second terminal device, the method comprising:
   receiving multicast information from a first terminal device;
   determining, based on a total quantity of terminal devices in a multicast group and a resource group of physical sidelink feedback channel resources, a physical sidelink feedback channel resource corresponding to a second terminal device, wherein the resource group is determined based on the total quantity of terminal devices and a sorting result; and
   sending feedback information to the first terminal device based on the physical sidelink feedback channel resource corresponding to the second terminal device.

2. The method for determining the physical sidelink feedback channel resource performed by the second terminal device according to claim 1, wherein determining, based on the total quantity of terminal devices and the resource group of physical sidelink feedback channel resources, the physical sidelink feedback channel resource corresponding to the second terminal device further comprises:
   determining, based on the total quantity of terminal devices, a quantity Ni of physical resource blocks (PRBs) occupied by the resource group, and an identifier of the second terminal device, a PRB occupied by the physical sidelink feedback channel resource corresponding to the second terminal device.

3. The method for determining the physical sidelink feedback channel resource performed by the second terminal device according to claim 2, wherein after Ni≥2M, an $i^{th}$ terminal device in M terminal devices corresponds to an $i^{th}$ PRB and an $(i+1)^{th}$ PRB, and M represents the total quantity of terminal devices or the total quantity of terminal devices minus 1.

4. The method for determining the physical sidelink feedback channel resource performed by the second terminal device according to claim 3, wherein determining, based on the total quantity of terminal devices and the resource group of physical sidelink feedback channel resources, the physical sidelink feedback channel resource corresponding to the second terminal device further comprises:
   after M represents the total quantity of terminal devices minus 1,
   generating, by the second terminal device, a temporary number of the second terminal device based on a number of the first terminal device in the multicast; and
   determining, by the second terminal device based on the total quantity of terminal devices, the resource group of the physical sidelink feedback channel resources, and the temporary number of the second terminal device, the physical sidelink feedback channel resource corresponding to the second terminal device; or
   after M represents the total quantity of terminal devices minus 1,
   sorting, by the second terminal device, the remaining terminal devices in the multicast based on a number of the first terminal device in the multicast; and
   determining, by the second terminal device based on the total quantity of terminal devices, the resource group of the physical sidelink feedback channel resources, and a sorting result, the physical sidelink feedback channel resource corresponding to the second terminal device.

5. The method for determining the physical sidelink feedback channel resource performed by the second terminal device according to claim 2, wherein after Ni≥2M, an $i^{th}$ terminal device in M terminal devices corresponds to an $i^{th}$ PRB and an $(Ni-i+1)^{th}$ PRB, and M represents the total quantity of terminal devices or the total quantity of terminal devices minus 1.

6. The method for determining the physical sidelink feedback channel resource performed by the second terminal device according to claim 2, wherein after Ni<2M, and Ni is an even number, Ni/2 PRBs with the first Ni/2 PRB sequence numbers carry an ACK, and Ni/2 PRBs with the remaining Ni/2 PRB sequence numbers carry a NACK; or Ni/2 PRBs with the first Ni/2 PRB sequence numbers carry a NACK, and Ni/2 PRBs with the remaining Ni/2 PRB sequence numbers carry an ACK; or
   after Ni<2M, and Ni is an odd number, $[N_i/2]$ PRBs with the first $[N_i/2]$ PRB sequence numbers carry an ACK, $[N_i/2]$ PRBs with the remaining $[N_i/2]$ PRB sequence numbers carry a NACK, and one PRB with an $([N_i/2]+1)^{th}$ PRB sequence number carries an ACK and a NACK; or $[N_i/2]$ PRBs with the first $[N_i/2]$ PRB sequence numbers carry a NACK, $[N_i/2]$ PRBs with the remaining $[N_i/2]$ PRB sequence numbers carry an ACK, and one PRB with an $([N_i/2]+1)^{th}$ PRB sequence number carries an ACK and a NACK, wherein M represents the total quantity of terminal devices or the total quantity of terminal devices minus 1.

7. The method for determining the physical sidelink feedback channel resource performed by the second terminal device according to claim 1, wherein the determining, based on the total quantity of terminal devices and the resource group of physical sidelink feedback channel resources, the physical sidelink feedback channel resource corresponding to the second terminal device further comprises:
determining, based on the total quantity of terminal devices and the quantity Ni of PRBs occupied by the resource group, a minimum sequence interval corresponding to the resource group; or
receiving, by the second terminal device, indication information from a network device or another terminal device, wherein the indication information indicates the minimum sequence interval corresponding to the resource group, the minimum sequence interval corresponding to the resource group is a minimum value in minimum sequence intervals corresponding to all of the $N_i$ PRBs, and the minimum sequence interval corresponding to each PRB is a minimum value in intervals of any two sequences in each PRB; and
determining, based on the minimum sequence interval corresponding to the resource group and the identifier of the second terminal device, a sequence corresponding to the physical sidelink feedback channel resource corresponding to the second terminal device.

8. The method for determining the physical sidelink feedback channel resource performed by the second terminal device according to claim 7, wherein after Ni≥2M, the minimum sequence interval is $N_{sc}$, $N_{sc}$ represents a total quantity of sequences, and M represents the total quantity of terminal devices or the total quantity of terminal devices minus 1.

9. The method for determining the physical sidelink feedback channel resource performed by the second terminal device according to claim 8, wherein after Ni<2M, a minimum sequence interval corresponding to each of x PRBs is the minimum sequence interval $\Delta_1$ corresponding to the resource group, and a minimum sequence interval corresponding to each of the remaining (Ni-x) PRBs is $\Delta_2$, wherein $$\Delta_2 = \lfloor (2 \times M - x \times \lfloor N_{sc}/\Delta_1 \rfloor)/(N_i - x) \rfloor, \text{ or}$$

$$\Delta_1 = \lfloor (2 \times M - (N_i - x) \times \lfloor N_{sc}/\Delta_2 \rfloor)/x \rfloor,$$

wherein
x is a positive integer, M represents the total quantity of terminal devices or the total quantity of terminal devices minus 1, and $N_{sc}$ represents a total quantity of sequences.

10. The method for determining the physical sidelink feedback channel resource performed by the second terminal device according to claim 9, wherein after Ni<2M, a minimum sequence interval corresponding to each of $$\left(2 \times M - N_i \times \left\lfloor \frac{2 \times M}{N_i} \right\rfloor\right)$$

PRBs is the minimum sequence interval $$\Delta_1 = \left\lfloor \frac{N_{sc}}{\left\lceil \frac{2 \times M}{N_i} \right\rceil} \right\rfloor$$

corresponding to the resource group, and a minimum sequence interval corresponding to each of the remaining $$\left(N_i - \left(2 \times M - N_i \times \left\lfloor \frac{2 \times M}{N_i} \right\rfloor\right)\right)$$

PRBs is $$\Delta_2 = \left\lfloor \frac{N_{sc}}{\left\lceil \frac{2 \times M}{N_i} \right\rceil} \right\rfloor,$$

wherein $$x = 2 \times M - N_i \times \left\lfloor \frac{2 \times M}{N_i} \right\rfloor.$$

11. The method for determining the physical sidelink feedback channel resource performed by the second terminal device according to claim 1, wherein the determining, based on the total quantity of terminal devices and the resource group, the physical sidelink feedback channel resource corresponding to the second terminal device further comprises:
after Ni<2M, and a product of a first sequence quantity $$\left\lfloor \frac{2 \times M}{N_i} \right\rfloor$$

and Ni is not equal to 2M, determining that the first sequence quantity is $$\left\lfloor \frac{2 \times M}{N_i} \right\rfloor$$

and a second sequence quantity is $$\left\lceil \frac{2 \times M}{N_i} \right\rceil;$$

determining, based on the first sequence quantity, the second sequence quantity, and a mapping relationship between a sequence quantity and a sequence cyclic shift index combination, a sequence cyclic shift index combination corresponding to the first sequence quantity and a sequence cyclic shift index combination corresponding to the second sequence quantity; and
determining, based on the identifier of the second terminal device, the sequence cyclic shift index combination corresponding to the first sequence quantity, and the sequence cyclic shift index combination corresponding to the second sequence quantity, a sequence corresponding to the physical sidelink feedback channel resource corresponding to the second terminal device; or after Ni<2M, and a product of a first sequence quantity $$\left\lfloor \frac{2 \times M}{N_i} \right\rfloor$$

and Ni is equal to 2M, determining that the first sequence quantity is $$\left\lfloor \frac{2 \times M}{N_i} \right\rfloor;$$

determining, based on the first sequence quantity and a mapping relationship between a sequence quantity and a sequence cyclic shift index combination, a sequence cyclic shift index combination corresponding to the first sequence quantity; and determining, based on the identifier of the second terminal device and the sequence cyclic shift index combination corresponding to the first sequence quantity, a sequence corresponding to the physical sidelink channel resource corresponding to the second terminal device, wherein Ni represents the quantity of PRBs occupied by the resource group, and M represents the total quantity of terminal devices or the total quantity of terminal devices minus 1.

12. The method for determining the physical sidelink feedback channel resource performed by the second terminal device according to claim 1, wherein the mapping relationship between a sequence quantity and a sequence cyclic shift index combination further comprises:

after the sequence quantity is 2, the sequence cyclic shift index combination is 0 and 6; or after the sequence quantity is 3, the sequence cyclic shift index combination is 0, 4, and 8; or after the sequence quantity is 4, the sequence cyclic shift index combination is 0, 3, 6, and 9; or after the sequence quantity is 5, the sequence cyclic shift index combination is 0, 2, 4, 6, and 9; or after the sequence quantity is 6, the sequence cyclic shift index combination is 0, 2, 4, 6, 8, and 10; or after the sequence quantity is 7, the sequence cyclic shift index combination is 0, 1, 2, 4, 6, 8, and 10; or after the sequence quantity is 8, the sequence cyclic shift index combination is 0, 1, 2, 3, 4, 6, 8, and 10; or after the sequence quantity is 9, the sequence cyclic shift index combination is 0, 1, 2, 3, 4, 5, 6, 8, and 10; or after the sequence quantity is 10, the sequence cyclic shift index combination is 0, 1, 2, 3, 4, 5, 6, 7, 8, and 10; or after the sequence quantity is 11, the sequence cyclic shift index combination is 0, 1, 2, 3, 4, 5, 6, 7, 8, 9, and 10; or after the sequence quantity is 12, the sequence cyclic shift index combination is 0, 1, 2, 3, 4, 5, 6, 7, 8, 9, 10, and 11.

13. The method for determining the physical sidelink feedback channel resource performed by the second terminal device according to claim 12, wherein the mapping relationship between the sequence quantity and the sequence cyclic shift index combination further comprises:

after the sequence quantity is 2, the sequence cyclic shift index combination is 0 and 6; or after the sequence quantity is 3, the sequence cyclic shift index combination is 0, 4, and 8; or after the sequence quantity is 4, the sequence cyclic shift index combination is 0, 3, 6, and 9; or after the sequence quantity is 5, the sequence cyclic shift index combination is 0, 3, 6, 8, and 10; or after the sequence quantity is 6, the sequence cyclic shift index combination is 0, 2, 4, 6, 8, and 10; or after the sequence quantity is 7, the sequence cyclic shift index combination is 0, 2, 4, 6, 8, 10, and 11; or after the sequence quantity is 8, the sequence cyclic shift index combination is 0, 2, 4, 6, 8, 9, 10, and 11; or after the sequence quantity is 9, the sequence cyclic shift index combination is 0, 2, 4, 6, 7, 8, 9, 10, and 11; or after the sequence quantity is 10, the sequence cyclic shift index combination is 0, 2, 4, 5, 6, 7, 8, 9, 10, and 11; or after the sequence quantity is 11, the sequence cyclic shift index combination is 0, 2, 3, 4, 5, 6, 7, 8, 9, 10, and 11; or after the sequence quantity is 12, the sequence cyclic shift index combination is 0, 1, 2, 3, 4, 5, 6, 7, 8, 9, 10, and 11.

14. A device comprising a transceiver, a processor, and a memory, the memory stores program instructions, and when the program instructions are executed, the device is configured to perform the steps:

receiving multicast information from a first terminal device;

determining based on a total quantity of terminal devices in a multicast group and a resource group of physical sidelink feedback channel resources, a physical sidelink feedback channel resource corresponding to the second terminal device, wherein the resource group is determined based on the total quantity of terminal devices and a sorting result; and sending feedback information to the first terminal device based on the physical sidelink feedback channel resource corresponding to the second terminal device.

15. The device according to claim 14, wherein determining, based on the total quantity of terminal devices and the resource group of physical sidelink feedback channel resources, the physical sidelink feedback channel resource corresponding to the second terminal device further comprises:

determining, based on the total quantity of terminal devices, a quantity Ni of physical resource blocks (PRBs) occupied by the resource group, and an identifier of the second terminal device, a PRB occupied by the physical sidelink feedback channel resource corresponding to the second terminal device.

16. The device according to claim 15, wherein after Ni≥2M, an $i^{th}$ terminal device in M terminal devices corresponds to an $i^{th}$ PRB and an $(i+1)^{th}$ PRB, and M represents the total quantity of terminal devices or the total quantity of terminal devices minus 1.

17. The device according to claim 14, wherein determining, by the second terminal device based on a total quantity of terminal devices and a resource group, a physical sidelink feedback channel resource corresponding to the second terminal device comprises:

after Ni<2M, and a product of a first sequence quantity $$\left\lfloor \frac{2 \times M}{N_i} \right\rfloor$$

and Ni is not equal to 2M, determining, by the second terminal device, that the first sequence quantity is $$\left\lfloor \frac{2 \times M}{N_i} \right\rfloor$$

and a second sequence quantity is $$\left\lceil \frac{2 \times M}{N_i} \right\rceil;$$

determining, by the second terminal device based on the first sequence quantity, the second sequence quantity, and a mapping relationship between a sequence quantity and a sequence cyclic shift index combination, a sequence cyclic shift index combination corresponding to the first sequence quantity and a sequence cyclic shift index combination corresponding to the second sequence quantity; and determining, by the second terminal device based on the identifier of the second terminal device, the sequence cyclic shift index combination corresponding to the first sequence quantity, and the sequence cyclic shift index combination corresponding to the second sequence quantity, a sequence corresponding to the physical sidelink feedback channel resource corresponding to the second terminal device; or after Ni<2M, and a product of a first sequence quantity $$\left\lfloor \frac{2 \times M}{N_i} \right\rfloor$$

and Ni is equal to 2M, determining, by the second terminal device, that the first sequence quantity is $$\left\lfloor \frac{2 \times M}{N_i} \right\rfloor;$$

determining, by the second terminal device based on the first sequence quantity and a mapping relationship between a sequence quantity and a sequence cyclic shift index combination, a sequence cyclic shift index combination corresponding to the first sequence quantity; and determining, by the second terminal device based on the identifier of the second terminal device and the sequence cyclic shift index combination corresponding to the first sequence quantity, a sequence corresponding to the physical sidelink channel resource corresponding to the second terminal device, wherein Ni represents the quantity of PRBs occupied by the resource group, and M represents the total quantity of terminal devices or the total quantity of terminal devices minus 1.

18. The device according to claim 14, wherein the mapping relationship between a sequence quantity and a sequence cyclic shift index combination comprises:
after the sequence quantity is 2, the sequence cyclic shift index combination is 0 and 6; or
after the sequence quantity is 3, the sequence cyclic shift index combination is 0, 4, and 8; or
after the sequence quantity is 4, the sequence cyclic shift index combination is 0, 3, 6, and 9; or
after the sequence quantity is 5, the sequence cyclic shift index combination is 0, 2, 4, 6, and 9; or
after the sequence quantity is 6, the sequence cyclic shift index combination is 0, 2, 4, 6, 8, and 10; or
after the sequence quantity is 7, the sequence cyclic shift index combination is 0, 1, 2, 4, 6, 8, and 10; or
after the sequence quantity is 8, the sequence cyclic shift index combination is 0, 1, 2, 3, 4, 6, 8, and 10; or
after the sequence quantity is 9, the sequence cyclic shift index combination is 0, 1, 2, 3, 4, 5, 6, 8, and 10; or
after the sequence quantity is 10, the sequence cyclic shift index combination is 0, 1, 2, 3, 4, 5, 6, 7, 8, and 10; or
after the sequence quantity is 11, the sequence cyclic shift index combination is 0, 1, 2, 3, 4, 5, 6, 7, 8, 9, and 10; or
after the sequence quantity is 12, the sequence cyclic shift index combination is 0, 1, 2, 3, 4, 5, 6, 7, 8, 9, 10, and 11.

19. A non-transitory computer-readable storage medium, wherein the non-transitory computer-readable storage medium comprises program instructions, and when the program instructions are run on a device, the device is configured to:
receiving multicast information from a first terminal device;
determining based on a total quantity of terminal devices in a multicast group and a resource group of physical sidelink feedback channel resources, a physical sidelink feedback channel resource corresponding to the second terminal device, wherein the resource group is determined based on the total quantity of terminal devices and a sorting result; and
sending feedback information to the first terminal device based on the physical sidelink feedback channel resource corresponding to the second terminal device.

20. The non-transitory computer-readable storage medium according to claim 19, wherein determining, based on the total quantity of terminal devices and the resource group of physical sidelink feedback channel resources, the physical sidelink feedback channel resource corresponding to the second terminal device further comprises:
determining, based on the total quantity of terminal devices, a quantity Ni of physical resource blocks (PRBs) occupied by the resource group, and an identifier of the second terminal device, a PRB occupied by the physical sidelink feedback channel resource corresponding to the second terminal device.

* * * * *